United States Patent
Paul et al.

(10) Patent No.: US 9,304,305 B1
(45) Date of Patent: Apr. 5, 2016

(54) ELECTROOPTICAL SENSOR TECHNOLOGY WITH ACTIVELY CONTROLLABLE OPTICS, FOR IMAGING

(75) Inventors: Andrew E. Paul, Tucson, AZ (US); David M. Kane, Tucson, AZ (US)

(73) Assignee: Arete Associates, Northridge, CA (US)

( * ) Notice: Subject to any disclaimer, the term of this patent is extended or adjusted under 35 U.S.C. 154(b) by 0 days.

(21) Appl. No.: 12/387,171

(22) Filed: Apr. 29, 2009

Related U.S. Application Data

(60) Provisional application No. 61/125,915, filed on Apr. 30, 2008.

(51) Int. Cl.
| | | |
|---|---|---|
| *H04N 7/18* | (2006.01) | |
| *G02B 15/163* | (2006.01) | |
| *G02B 13/12* | (2006.01) | |

(52) U.S. Cl.
CPC ............. *G02B 15/163* (2013.01); *G02B 13/12* (2013.01)

(58) Field of Classification Search
CPC .... G02B 27/646; G02B 13/009; G02B 13/12; G02B 15/163
USPC ......................................................... 348/144
See application file for complete search history.

(56) References Cited

U.S. PATENT DOCUMENTS

| | | | | |
|---|---|---|---|---|
| 4,991,020 | A * | 2/1991 | Zwirn ............................ | 348/563 |
| 5,005,083 | A * | 4/1991 | Grage et al. ................... | 348/588 |
| 5,077,609 | A * | 12/1991 | Manelphe ...................... | 348/144 |
| 6,285,501 | B1 * | 9/2001 | Suzuki ............................ | 359/554 |
| 6,359,681 | B1 * | 3/2002 | Housand et al. .............. | 356/4.01 |
| 6,366,311 | B1 * | 4/2002 | Monroe .......................... | 348/148 |
| 6,975,246 | B1 * | 12/2005 | Trudeau .......................... | 340/903 |
| 7,010,202 | B1 * | 3/2006 | Graham et al. ................ | 385/119 |
| 7,773,116 | B1 * | 8/2010 | Stevens ........................ | 348/208.4 |
| 8,102,423 | B2 * | 1/2012 | Cheng ............................ | 348/159 |
| 2003/0025791 | A1 * | 2/2003 | Kaylor et al. .................. | 348/143 |
| 2005/0007478 | A1 * | 1/2005 | Ahiska ........................... | 348/335 |
| 2005/0134440 | A1 * | 6/2005 | Breed ............................ | 340/435 |
| 2005/0177307 | A1 * | 8/2005 | Greenfeld et al. ............. | 701/220 |
| 2006/0049350 | A1 * | 3/2006 | Teich et al. .................... | 250/330 |
| 2007/0002443 | A1 * | 1/2007 | Toyama ......................... | 359/557 |
| 2007/0052856 | A1 * | 3/2007 | Jung et al. ...................... | 348/565 |
| 2008/0088719 | A1 * | 4/2008 | Jacob et al. .................... | 348/241 |
| 2009/0102924 | A1 * | 4/2009 | Masten, Jr. ..................... | 348/155 |
| 2009/0225165 | A1 * | 9/2009 | Reneker et al. ................ | 348/144 |
| 2009/0321636 | A1 * | 12/2009 | Ragucci et al. ................ | 250/330 |
| 2010/0002071 | A1 * | 1/2010 | Ahiska ............................ | 348/36 |
| 2011/0007161 | A1 * | 1/2011 | Batchko et al. ................ | 348/144 |
| 2011/0164108 | A1 * | 7/2011 | Bates et al. ..................... | 348/36 |

OTHER PUBLICATIONS

Hua, et al., Dual-sensor Foveated Imaging System, Applied Optics, 2008, 317-327, vol. 47, No. 3.

* cited by examiner

*Primary Examiner* — Blake Rubin
(74) *Attorney, Agent, or Firm* — Furman IP Law

(57) ABSTRACT

Plural image planes are illuminated through a single image-collecting objective system. The field of view or magnification (or both), is allocated dynamically among the plural planes. Preferably the planes include two detector planes—one corresponding to a wide field of view (FOV) and the other to a steerable narrow one. Allocation is performed by a beam splitter in combination with a steering mirror, or steering-mirror array, that steers both fields together. The splitter isolates radiation corresponding to the narrow FOV from radiation corresponding to the wide FOV. In method forms of the invention, an electrooptical observation system produces simultaneous plural images for a region of interest. The system displays simultaneous images having respective plural resolutions. In operation a first, relatively wider FOV continuously covers a region of interest; while the second is narrower and has finer resolution than the first.

12 Claims, 18 Drawing Sheets

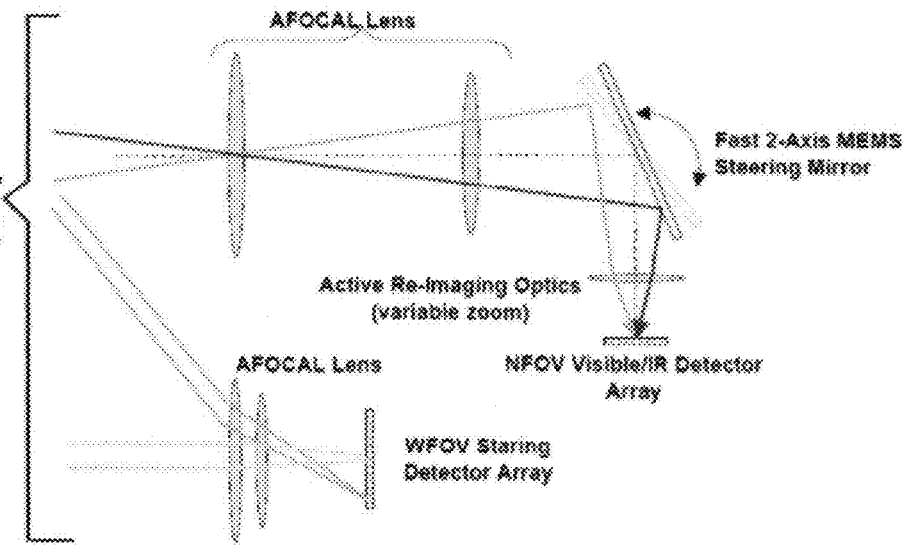
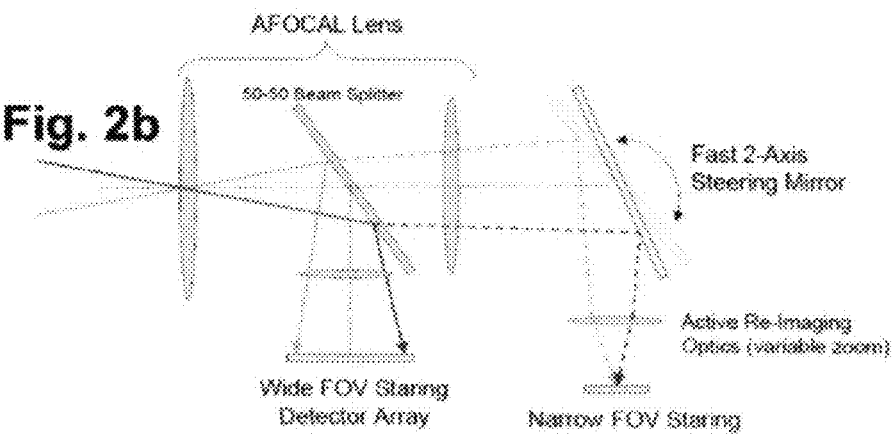
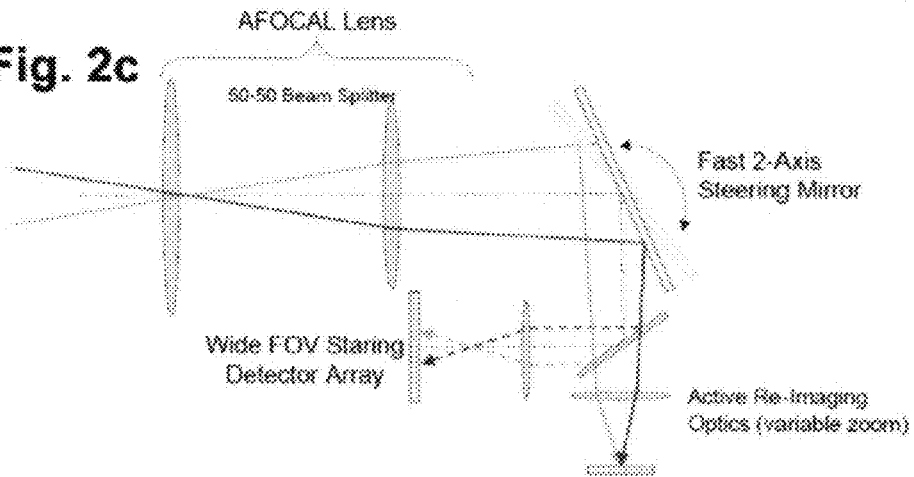

Fig. 5
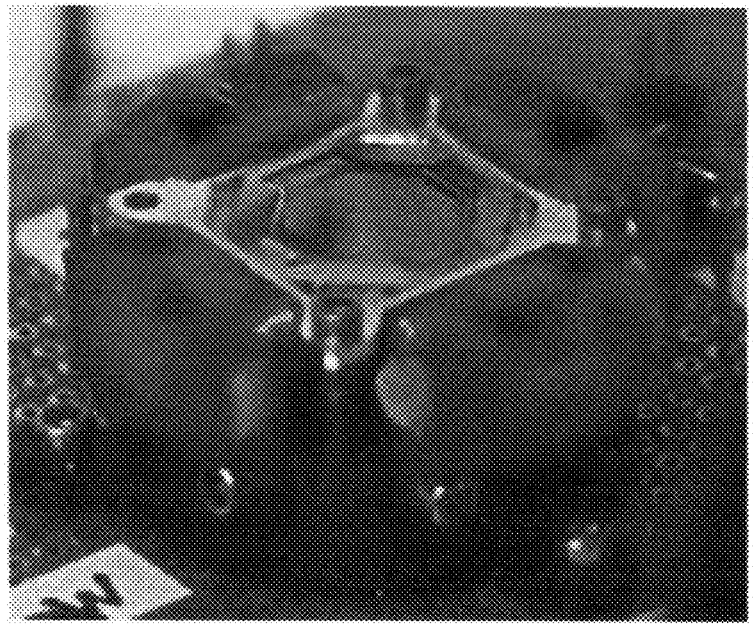
Fig. 6   A                              B
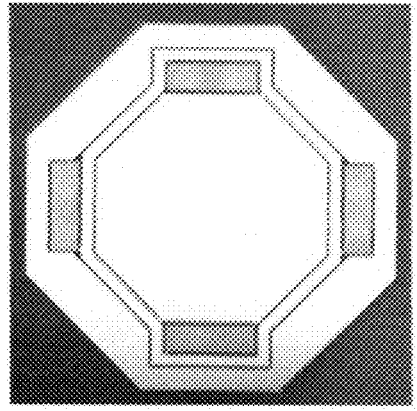   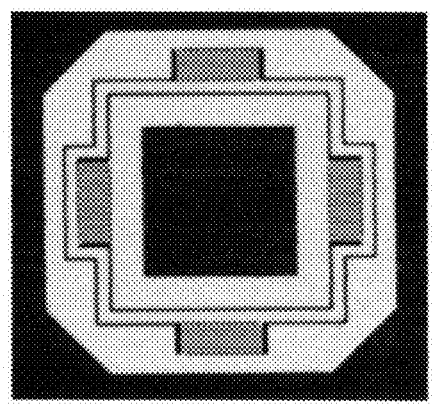

after Wallace

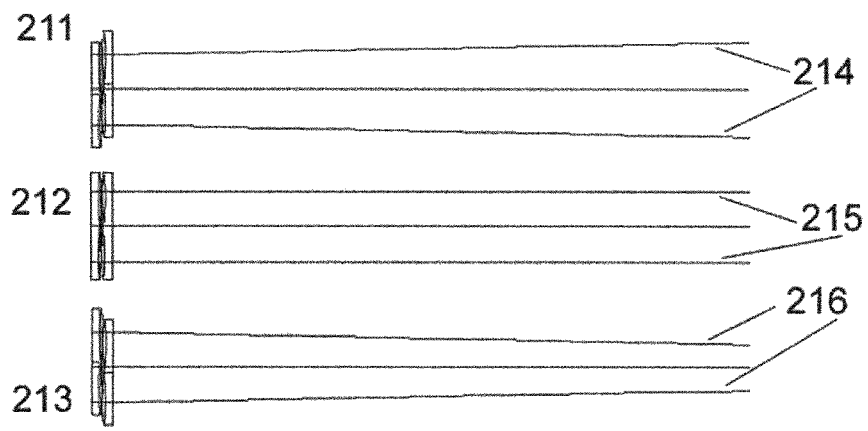
Fig. 12c
Fig. 12d
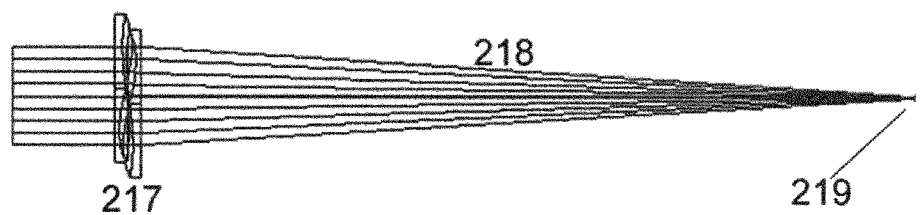

after Betensky

ELECTROOPTICAL SENSOR TECHNOLOGY WITH ACTIVELY CONTROLLABLE OPTICS, FOR IMAGING

PRIORITY STATEMENT

The application claims the priority of U.S. Provisional No. 61/125,915, entitled "ELECTRICAL SENSOR TECHNOLOGY WITH ACTIVELY CONTROLLABLE OPTICS, FOR IMAGING" and filed Apr. 30, 2008.

BACKGROUND

Portions of this invention are very closely related to earlier coowned patent documents directed to optical systems and methods for imaging, and for noticing and optically following a large variety of objects outside an optical system. These techniques included capabilities for "steering" of radiation beams, using any of a great variety of optical-deflection or -switching arrangements.

Such arrangements comprised using pointable mirrors of many different types, and other kinds of routing devices such as an optical-switch "fabric", and birefringent and other nonlinear materials, all generally positioned within an optical system. The mirrors included individual reflectors, and reflector arrays, over a broad range of sizes and typically controllable in two axes of rotation as well as in some cases piston movement.

Some of the mirrors were microelectromechanical system ("MEMS") units or other micromechanical devices—i.e. not limited to electrical or electronic control. Among the relatively larger mirrors (for instance those over 5 mm across) were magnetically driven individually gimbaled mirrors using, for example, custom jewel bearings—or etched monosilicon in-plane torsion hinges (or "flexures").

These earlier patent documents included:
Bowker et al. U.S. Pat. No. 5,467,122, "UNDERWATER IMAGING SYSTEM";
Lubard et al., U.S. Pat. No. 6,836,285, "LIDAR WITH STREAK-TUBE IMAGING, INCLUDING HAZARD DETECTION IN MARINE APPLICATIONS; RELATED OPTICS";
Kane et al., U.S. Pat. No. 6,856,718 "HIGH-SPEED, LOW-POWER OPTICAL MODULATION APPARATUS AND METHOD";
Bowker et al., U.S. Pat. No. 6,873,716, "CONFOCAL-REFLECTION STREAK LIDAR APPARATUS WITH STRIP-SHAPED PHOTOCATHODE, FOR APPLICATIONS AT A WIDE RANGE OF SCALES";
Gleckler, U.S. Pat. No. 7,227,116, "VERY FAST TIME RESOLVED IMAGING IN MULTIPARAMETER MEASUREMENT SPACE";
Kane et al., U.S. Pat. No. 7,297,934, "OPTICAL SYSTEM";
Kane et al., international application PCT/US05/28777, "AFOCAL BEAM STEERING SYSTEM CORRECTED FOR EXCESS DIFFRACTION DUE TO PHASE ERROR FROM MICROELECTROMECHANICAL MIRROR OFFSETS";
Fetzer et al., international application PCT/US04/00949, "ULTRAVIOLET, INFRARED, AND NEAR-INFRARED LIDAR SYSTEM AND METHOD";
McLean et al., international application PCT/US06/46535, "MINIATURE INTEGRATED MULTISPECTRAL/MULTIPOLARIZATION DIGITAL CAMERA";
Kane et al., international application PCT/US07/14992, "CAMERA-STYLE LIDAR SETUP";
Campion et al., international application PCT/US07/25912, "REFINED OPTICAL SYSTEM";
Griffis et al., application Ser. No. 10/426,907, "COMPACT ECONOMICAL LIDAR SYSTEM";
Kane et al., application Ser. No. 11/431,209, "OPTICAL-RADIATION PROJECTION";
Kane, application Ser. No. 11/796,603 "OPTICAL SYSTEMS AND METHODS USING LARGE MICROELECTROMECHANICAL-SYSTEMS MIRRORS"; and
Hunt et al., provisional application Ser. No. 60/999,159, "OPTICAL SYSTEM WITH MINIATURE SCANNING MIRROR".

All these documents are wholly incorporated by reference into this present document. The present invention, however, is not limited to teachings in those earlier documents—given that, for instance, mirror adjustments by galvanometer scanner and other steering systems are also applicable.

Among these earlier documents are teachings of a proprietary CatsEye™ object-warning system. These documents teach advanced and excellent apparatus and methods for imaging from aircraft and many other kinds of mounting arrangements, both vehicular and stationary, and in many useful practical applications encompassing, merely by way of example, commercial-airline flight-control imaging e.g. from fixed towers, astronautical rendezvous, ground-planned defense maneuvers, and vehicle collision avoidance, as well as terrain mapping from space.

More specifically the above-mentioned earlier documents teach such innovations with greater field of regard ("FOR") and field of view ("FOV") than in prior approaches, and with much more nimble and sophisticated capability to notice and optically follow a large variety of objects outside the optical system, than previously possible. Even the technologies in those coowned documents, however, leave something to be desired in ability to simultaneously acquire images, and parts of images, at different scales or magnifications—with extremely high flexibility and adaptability.

Whereas aperture-sharing and field-sharing innovations in some of those documents do enable simultaneous imaging in different directions and at different magnifications, what remains lacking is ability to change focal properties very quickly, to obtain arbitrary values of magnification. The desirable adjustments mentioned here are not "pixel zoom" features such as found in some digital consumer-electronics cameras. Adjustments of that type commonly produce objectionably coarse images, merely extracted from large fields of pixels.

Rather what is desired is in effect an "optical zoom" charsacteristic, with resulting images limited only by the quality of optical elements. As is well known, however, conventional optical-zoom provisions are strictly constrained to the speed at which macroscopic optomechanical components can be bodily moved. Nevertheless, as will be seen, some such components are compatible with some embodiments of our present invention.

The previously mentioned servoed-mirror components, taught in the coowned patent documents, made major advances in relieving speed and agility limitations of old-fashioned gimbal systems—i.e., for pointing of entire optical systems. What is needed now is relief from the analogous limitations of individual focal elements and focal systems.

It is true that some controllable focal properties are represented in those above-mentioned documents, particularly through the use of servoed-mirror arrays—which can be caused to provide active optical elements that are microminiatures of the famous and enormous astronomical observatories in Hawaii and elsewhere. The servoed-mirror-array approach, however, is relatively expensive—and delicate and fragile as well. Thus there remains a need for individual focal adjustments that are not only easily adjustable and very fast, but also extremely robust and economical.

A particularly troublesome limitation of imaging systems heretofore, especially when such systems are carried in remotely operated observation or mapping vehicles (e.g. aerial drones), is that a remote operator cannot readily see high-resolution images, simultaneously, of both:

a broad region of interest, for purposes of gaining awareness of a situation that is extended throughout the broad region—i.e. so-called "situational awareness"; and a much narrower area showing important details, in effect a so-called "telephoto view" of features such as vehicles, structures, animals or people.

Such simultaneous high-resolution images can be obtained if the platform vehicle has plural separate cameras, each having its own objective system with its own separate optical aperture; however, this approach is relatively undesirable. Use of separate systems introduces new problems of image-position alignment (i.e. positional correlation) and parallax, as well as consistent tonal ranges—and of course added operating complexity, weight, cost, and power drain.

People skilled in this field will immediately appreciate that an inability to see such high-resolution images at plural different scales simultaneously (unless two separate objective systems are provided) is extremely disadvantageous. Such inability handicaps the operator severely.

More specifically, the operator either cannot see precisely the details needed to make identifications based on the details, or to take a desired action with respect to the details; or cannot continuously monitor the overall region of interest—to be confident that the situation is not changing importantly while the details are inspected, or while preparations are being made for action. To maximize the probability of success, whether the mission actually is an interdiction or simply a comprehensive inspection, both these kinds of visual information are needed at substantially the same time. An object of our invention is to remove this limitation.

Very-Recent Innovations Known Only in Other Fields:

The following details are not seen either in conventional imaging literature—or in "general" optics papers and patents, if indeed there is modernly such a thing as "general optics". The formerly unified, or primarily unified, field of optics has now subdivided itself into literally many dozens of individual fields of optics and optronics, all extraordinarily isolated from one another.

These many individual fields actually are documented by corresponding dozens and even hundreds of separate scientific and engineering journals, convocations and seminars—all around the world. It is therefore nowadays in essence a physical impossibility for any one scientist or engineer (or even a sizable laboratory or academic department) to follow all of the literature of "optics"—or of any sizable fraction of the new separate individual fields.

People in these many new subfields do not generally talk to each other, or write to each other, or read each other's literature. Therefore it would not at all be obvious for a typical worker in, e.g., astronautical imaging, to know much if anything about the details taken up below.

Liquid lenses—The discussion here is believed to be, heretofore, unique to the field of cellular telephones. This field is not usually conceptualized as a field of "optics", but it is common knowledge now that in recent years camera capabilities are provided in some such telephones.

Designers of such equipment have confronted and successfully resolved startlingly difficult problems, to cause those camera functions to be routinely available in cellular phones. Those phones which can take pictures—and receive and send pictures through the cellular-telephone network, as well—are not significantly different from other cellular telephones in weight, reliability, power requirements, or even cost.

One key innovation that has enabled this achievement is the development of a so-called "liquid lens". The fact that the lens itself is literally liquid enables the lens to be variable in focus. Furthermore the variable focus is controllable electrically. To be specific, a variable electrical charge is applied to deform the meniscus of the lens, and that meniscus is itself a focal surface.

Hence the variable charge thereby changes the effective radius of curvature of the focal surface, and the focal length of the camera. Further specifics of these remarkable devices are set forth in later sections of this document.

Diffractive lenses—The devices under discussion here are most typically controllable Fresnel lenses. These devices too are operated by electrical signals applied to modify focal properties, but the lenses are substantially solid, rather than liquid—notwithstanding their use of so-called "liquid crystals".

Development in this field is driven not by anything related to cellular telephones, but rather by ophthalmic applications, i.e. so-called "active" eyewear. At the heart of switchable/variable diffractive lenses are nematic liquid crystals, used to implement the desired focal variations.

Historically efforts to develop this technology have met with limited success, for a variety of reasons: in some cases the thickness of the liquid-crystal layers (exceeding 400 μm) made their response low and recovery times long, and their transmission low as well—because of optical scattering. High-efficiency liquid-crystal-based diffractive devices have been demonstrated for beam steering, but less attention has been given to imaging applications.

Recently, however, the University of Arizona has developed a photolithographically patterned thin diffractive lens with large aperture, fast response, and a power-safe configuration for ophthalmic applications. Only a fixed number of Fresnel zones is possible with an active diffractive lens; hence the device has discrete optical powers, leading to a discrete zoom capability.

The University's approach for the active diffractive lens employs a photolithographically patterned thin diffractive lens with large aperture, fast response time, and a power-failure-safe configuration. A diffractive lens, for this purpose, is produced in the normal way used for Fresnel lenses, by "removing" from the refractive lens excess thickness that produces multiple-$2\pi$ phase retardation—thereby leaving only the optically active focal surface. Such "removing" results in multiple Fresnel zones.

Here, however, each zone is made up of one more corresponding liquid crystals. Each liquid crystal is substantially analogous to the liquid crystals in a common liquid-crystal display ("LCD"), with electrodes used to control optical contrast.

(To be precise, a Fresnel lens is not usually produced by reprocessing an existing refractive lens. Rather, the "removing" is a matter of design, commonly effectuated by casting the Fresnel lens at the outset.)

The phase jump at each zone boundary is $2\pi$ for the design wavelength. The outer radius of each zone is analytically derived, and to digitize the process the continuous phase profile in each zone is divided into multiple subzones with a series of discrete phase levels, as will be detailed later in this document. Increasing the number of subzones increases diffraction efficiency, reaching maximum values of 40.5%, 81.1%, and 95.0% for lenses with two, four, and eight phase levels per zone, respectively.

Selection of Fresnel zones electrically—to invoke desired zoom values—is accomplished by applying voltages to electrodes associated with the multiple liquid crystals which make up the lens zones. Such voltage application is closely analogous to the actuation of visible elements in a common LCD.

Alvarez lenses—Additional active-lens technology is also being developed that may be used for the current invention. A worthwhile example is assembly of two so-called "Alvarez lenses" in a Galilean-telescope configuration to build a zoom lens.

As originally conceived some four decades ago, an individual Alvarez lens consists of two complementary phase plates 201, 202 (FIG. 12a), each a transmissive, refractive element with a third-order polynomial surface—and each having a first optical surface that is planar and a second contoured in a two-dimensional cubic profile. When a single such "phase plate" is placed in an optical beam, the plate introduces a phase shift in the beam.

Because manufacture of these refractive plates is very difficult, some workers have concentrated on diffractive versions of Alvarez devices, but for our purposes refractive plates (being faster and having less wavelength dependence) appear preferable. Near the end of this document we present a more-detailed discussion of Alvarez lenses and other alternative zoom-lens systems.

Deformable polymer liquid zoom lenses—Transparent polymer membranes are configured to pump liquid in and out of a lens cavity, by stretching or squeezing a chamber that is filled with the liquid. Contraction caused by squeezing makes the lens more strongly positive; squeezing makes the lens more negative. Furls they details appear later in this document.

Conclusion—As noted above, the present state of the art in imaging, while admirable, leaves considerable refinement to be 2o desired.

SUMMARY OF THE DISCLOSURE

The present invention provides exactly such refinement. The invention has major aspects, or primary facets, that can be used independently. Alternatively however, they can be used in combination together. In preferred embodiments of a first of its main facets, the invention is an imaging system that includes plural imaging planes, illuminated through a single image-collecting objective system.

This first aspect of the invention also includes some means for dynamically allocating field of view, or magnification—or both field of view and magnification—among the plural imaging planes. The foregoing may represent a description or definition of the first aspect or facet of the invention in its broadest or most general form. Even as couched in these broad terms, however, it can be seen that this facet of the invention importantly advances the art.

In particular, this first aspect of the invention eliminates the previously described problem of lacking simultaneous views at different scales. As detailed earlier, it is difficult for an operator to act effectively, based upon only a limited view of a region of interest—particularly with either a narrow view or a wide view but not both. With this first major facet of the invention, there are now instead two or more imaging planes; and at least one of (1) the field of view or (2) the magnification is allocated dynamically between or among these imaging planes.

Thus for example a relatively wide field of view may be allocated to one or more imaging planes and a narrower field to one or more other imaging planes. According to our invention such allocation is most-commonly defined and implemented in real time by an operator of the system—who is typically remote from the system, particularly if the system is mounted in a remote-control vehicle such as, merely by way of example, a drone aircraft.

Real-time operator definition and implementation of the field of view (or magnification), however, is not a requirement of the invention. Rather, such details can be set in advance, or preferably made programmable for automatic setting during operation—all depending on field conditions such as illumination, activity in the area, topography, weather, and so forth.

By the terminology "allocating" a field of view we mean to encompass defining and establishing boundaries of a scene (e.g. one scene, of plural scenes to be imaged) and placement of that scene image relative to one or more other scenes of the plurality—usually on an operator's visible display. The plural images may all be arrayed together on a single common monitor, or on separate but adjacent or otherwise nearby monitors as preferred.

There is another degree of freedom, however, in use of this system: as noted above, not only the field of view but the magnification, as well, can be allocated between or among the plural imaging planes. By this we mean that high or low magnification can be assigned to each of the scenes, respectively—as will be further detailed shortly—all according to preferences of the system designer or operator.

Yet the system of this first principal facet of the invention also eliminates the main drawback of prior-art plural-image systems—specifically the disadvantage of requiring correspondingly plural cameras or objective systems. This drawback is eliminated because the first major aspect of the invention collects all the information for these plural scenes through a single, unitary objective and aperture.

More specifically, the one objective system acquires the two or more scenes, with their respected allocated magnifications, or fields of view—or both. Hence the system (despite its remarkable capabilities) is very nearly as compact, light in weight, economical and power thrifty as an ordinary single camera.

Although the first major aspect of the invention thus significantly advances the art, nevertheless to optimize enjoyment of its benefits preferably the invention is practiced in conjunction with certain additional features or characteristics. In particular, one basic preference is that the objective system be pointable over a generally hemispherical or generally panoramic field of regard. (This is a "basic" preference in the sense that it is applicable directly to the broadly stated first main facet of the invention as set forth above.)

If this basic preference is observed, then one further preference or "subpreference" is that the allocating means include some means for varying the field of view over a magnification range of at least a factor of twelve. For clarification, by "magnification range" here we mean the range of magnification values between the coarsest and finest magnification ratios of the system.

An alternative subpreference is that the range be at least a factor of six. Another is that the magnification range be at least a factor of three. People skilled in this field will appreciate that the particular range which is most preferable depends, typically, upon the kind of region involved, the field conditions, and the purposes of the imaging.

Another subpreference is that the varying means include an electronically controllable optical zoom. Within this subpreference, in turn, we still further prefer that the electronically controllable optical zoom include:
- an electronically operated mechanical zoom lens;
- an electronically operated Alvarez refractive or diffractive zoom lens; or
- an electronically operated liquid zoom lens or diffractive zoom lens.

In all such cases we prefer also that the system further include an afocal optical front end.

Another basic preference is that the allocating means include some means for varying the field of view over a magnification range of at least a factor of three times the resolution of the lowest-resolution imaging plane. (The "range" as defined here is thus slightly different from the range as defined three paragraphs above.)

Another basic preference is that the allocating means include some means for varying the field of view over a magnification range, between coarsest and finest magnification ratios, of at least a factor of three. These varying means in turn preferably include an electronically controllable optical zoom.

We have several alternative preferences as to the nature of this zoom:
- for some purposes it ideally includes at least one liquid or diffractive lens;
- for other purposes it preferably includes a hybrid focusing subsystem, of at least one each of two different types of variable focusing elements;
- in this latter case the at least one of each of two focusing-element types includes at least one liquid lens and at least one diffractive lens.

In the last-stated situation the hybrid subsystem has in combination a zoom capability that:
- switches or steps among or between a first set of discrete magnification levels established by the at least one diffractive lens, and
- is continuous over a range of some magnification levels established by the at least one liquid lens.

Another alternative preference is that the optical zoom include at least one variable-focus module selected from these types:
- an electrowetting liquid lens;
- a microfluidic liquid lens;
- a flexible polymer lenses;
- a liquid-crystal diffractive lens;
- an Alvarez refractive lens;
- an Alvarez diffractive lens;
- one or more deformable mirrors;
- a MEMs mirror array;
- a prism-based lens;
- a flexible polymer lens; or
- a liquid-crystal diffractive lens, or other liquid-crystal-based lens.

Still another alternative preference is that the optical zoom include at least one zoom lens that has optical power varied by mechanical motion of one or more lens elements—i.e., a mechanical zoom lens. This mechanical lens, however, is preferably (though not necessarily) controlled electronically.

In this case and the other zoom-feature variants introduced above, we prefer that the system further include an afocal optical front end. At least one focusing lens is included, to receive optical information from the afocal front end and form an image on a respective imaging plane.

Another basic preference is that the plural imaging planes include at least one detector plane corresponding to a wide field of view, and at least one detector plane corresponding to a steerable narrow field of view—and that the "allocating means" include some means for steering the narrow field of view. These "steering means" in turn ideally include an optical beam splitter to isolate or segregate radiation corresponding to the narrow field of view, from radiation corresponding to the wide field of view—together with a steering mirror or steering-mirror array intercepting and deflecting substantially only the radiation corresponding to the narrow field of view. Another preference is that the steering mirror, or array, provide pointing accuracy, with respect to angular variation in object space, on the order of 0.1 milliradian.

Another alternative basic preference is that the plural imaging planes include at least one plane corresponding to a wide FOV, and at least one corresponding to a steerable narrow FOV. Here the "allocating means" include some means for steering both fields together; and the steering means include:
- a beam splitter isolating radiation corresponding to the narrow field of view from radiation corresponding to the wide field of view; and
- a steering mirror or steering-mirror array intercepting and deflecting the radiation corresponding to both of the fields of view.

The character and purpose of this very interesting form of the invention—in which the fields move together and most-typically are fixed in relative size—are noted in the "DETAILED DESCRIPTION" section of this document.

Yet another basic preference, particularly in imaging scenes from a vehicle, is to include some means for mounting the system in the vehicle. In this case we have a subpreference, namely that the invention encompass the imaging system in combination with the vehicle. To clarify: while the vehicle is an element of only the operating environment of the invention in the basic preference first-stated in this paragraph, the vehicle is an element of the invention itself in the subpreference case. Our imaging system enhances and improves the functions and capabilities of the vehicle—and its marketplace demand—so very strikingly as to multiply manifold the operational effectiveness and value of the combination, as compared with those of the vehicle alone. The point of defining the invention according to this subpreference is to establish that the measure of damages for infringement of this form of our invention is most-properly based, as expressly approved by present-day caselaw, upon the value of the combination, not just the value of the imaging system alone.

In preferred embodiments of its second major independent facet or aspect, the invention is a method for operating an electrooptical observation system that produces simultaneous plural images for a region of interest—in which at least some of the images have respective plural resolutions. The method includes this step: operating the system to display simultaneous images having respective plural resolutions. This step, and the others recited below, are performed by a remote operator.

The method also includes the step of controlling the system to cause:
- at least a first one of the images to have a relatively wider field of view, and to continuingly cover a region of interest, and
- at least a second one of the images to have a narrower field of view, with finer resolution than the relatively-wider-field image, continuingly directed toward a particular detail or details within or associated with the region of interest.

In addition the method includes a third step—namely, using the system to:
- identify and follow, in the wider-field image, the region of interest to maintain an overall situational awareness; and concurrently observe as a real-time telephoto view, in the narrower-field image, relatively higher-resolution data and visible scenes for relatively finer investigation and analysis of one or more specialized details.

The foregoing may represent a description or definition of the second aspect or facet of the invention in its broadest or most general form. Even as couched in these broad terms, however, it can be seen that this facet of the invention importantly advances the art.

In particular, this method facet of the invention extends into the method regime all the benefits of the above-introduced system (i.e. apparatus) aspect of the invention. Through performance of this second facet of the invention an operator actualizes and implements all the advantages and improvements of our imaging system: freedom from onerous single-image constraints, but without problematically increased system complexity, operating time, weight, cost, or power drain.

Although the second major aspect of the invention thus significantly advances the art, nevertheless to optimize enjoyment of its benefits preferably the invention is practiced in conjunction with certain additional features or characteristics. In particular, preferably the specialized details include at least one detail selected from these types: structures, vehicles, moving objects, animals, marine creatures, and people.

When the system is capable of at least one resolution corresponding generally to a hemispherical or panoramic field of regard, we prefer to include the steps of:
  adjusting the relatively wider view to, very generally, a hemispherical or panoramic field of regard, and
  adjusting the relatively narrower field to a magnification in a range, between coarsest and finest magnification ratios, of three to twelve times.

An alternative preference to the magnification-adjusting step just described, when hemispherical or panoramic field of regard is available, is adjusting the relatively narrower field to a magnification in the range, between coarsest and finest magnification ratios, of three to twelve times the resolution of the lowest-resolution imaging plane.

When the system also has an inertial-navigation system and a steering mirror; we prefer including the steps of:
  operating the system to employ the inertial-navigation system for measuring spatial coordinates of the relatively narrower view, or of at least one object therein, or both; and
  operating the system to incorporate information from the inertial-navigation system to substantially stabilize the mirror with respect to inertial space.

In this case another preference is that the information-incorporating operating step also stabilize the relatively narrower view with respect to the relatively wider view. When spatial coordinates are available, we also prefer to include the step of forwarding measured spatial-coordinate information to a remote facility or platform for use in another application. Yet another preference is using measured spatial-coordinate information to control an action.

In this situation, preferably the action-controlling step includes a course correction of the vehicle to avoid a collision or to effect a rendezvous. An alternative preference is including a direct call for operating a weapon to impair an object or creature appearing in one or more of the images.

When the system includes a steering mirror, to intercept and deflect radiation that forms the relatively narrower field of view, we also prefer that the action-controlling step include operating the steering mirror to point the relatively narrower field toward a particular region of interest within the relatively wider field. Here, when the steering mirror is a two-axis mirror, we further prefer that the mirror-operating step include adjusting the mirror in two generally orthogonal directions within the relatively wider field.

Principles and advantages of the invention will be more-fully understood from the following description of preferred embodiments, considered together with the accompanying illustrations, of which:

BRIEF DESCRIPTION OF THE DRAWINGS

FIG. 1 is a set of six conceptual perspective representations of operational implementations of the proposed roving foveal sensor, each implementation being capable of simultaneously generating a wide-FOV image and a narrow-FOV image (see respective inset views)—all at high resolution—and wherein each representation includes a narrow-FOV image and a wide-FOR (or wide-FOV) image—with the corresponding narrow-FOV image inset into the wide-FOR (or wide-FOV) image, making a composite output view; and wherein each of the representations also shows a preferred embodiment of the invention collecting those two images; and more specifically:

FIG. 1d shows military surveillance—as in imaging of a military camp, with barracks and parked vehicles or the like;
FIG. 2 is a set of three optical diagrams, somewhat conceptual, of the roving foveal design—some including a mirror or beam splitter, or both, for picking off a large-FOR "staring" view from inside an afocal optical assembly; more specifically:
FIG. 2a (with two subviews, one having no steering mirror) shows a layout in which a narrow-FOV image is substantially independent of (but can be correlated with) a wider-FOV or FOR image;
FIG. 2b shows a different (and usually more highly preferred) configuration, in which a narrow-FOV image is movable with respect to the wider-FOV or FOR image, for viewing, so that an inset narrow-FOV image can be placed—relative to the wider image—as preferred by an operator or system designer, and indeed can be moved about, in relation to the wider image, in real time;
FIG. 2c shows yet another configuration, in which the narrow-FOV image is fixed relative to (e.g. preferably centered within) the wider image view;
FIG. 5 is a perspective view of an operational two-axis-controllable, octagonal servoed-steering-mirror assembly;
FIG. 6 is a pair of perspective views of servoed macromirrors (such as, merely by way of example and without limitation) MEMS mirrors, each 1 cm across—at left, an octagonal unit corresponding to the FIG. 5 assembly; and at right a more recent, improved square unit (showing its magnet side)

DETAILED DESCRIPTION OF PREFERRED EMBODIMENTS

Preferred embodiments of our invention provide an optically agile imaging system, with related methods, based upon certain active optical components—in combination with a servoed-beam-steering subsystem according to the coowned patent documents listed earlier. The result encompasses a small, lightweight and relatively economical sensor technology with dynamically allocable FOV and magnification.

This technology is most typically for use with small unmanned vehicles, whether aerial or otherwise, although the invention is compatible with manned craft and indeed stationary installations as well. Preferred embodiments of the invention have several practical applications mentioned earlier.

Figure 1A:
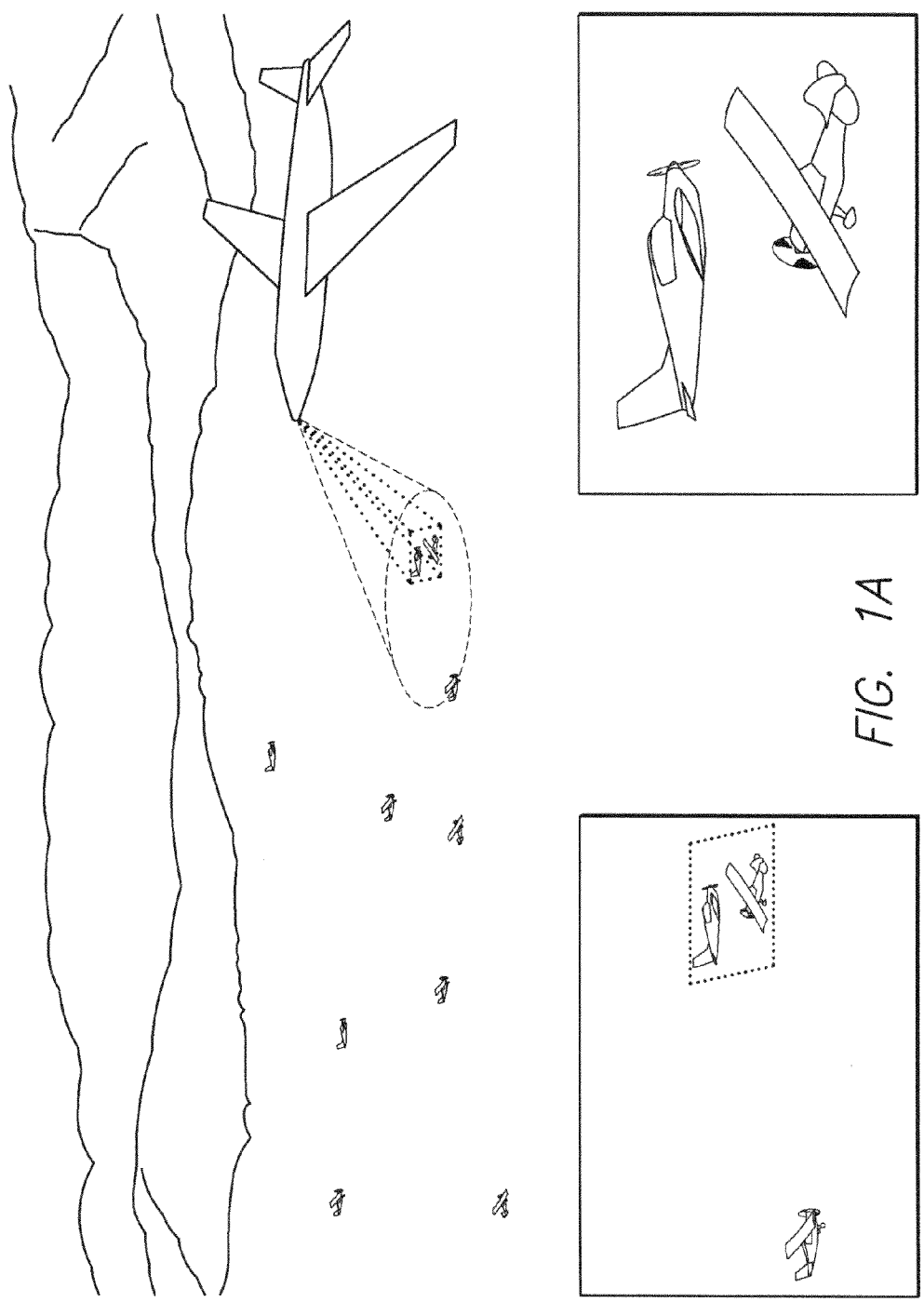
FIG. 1a shows general-aviation collision avoidance.
Figure 1B:
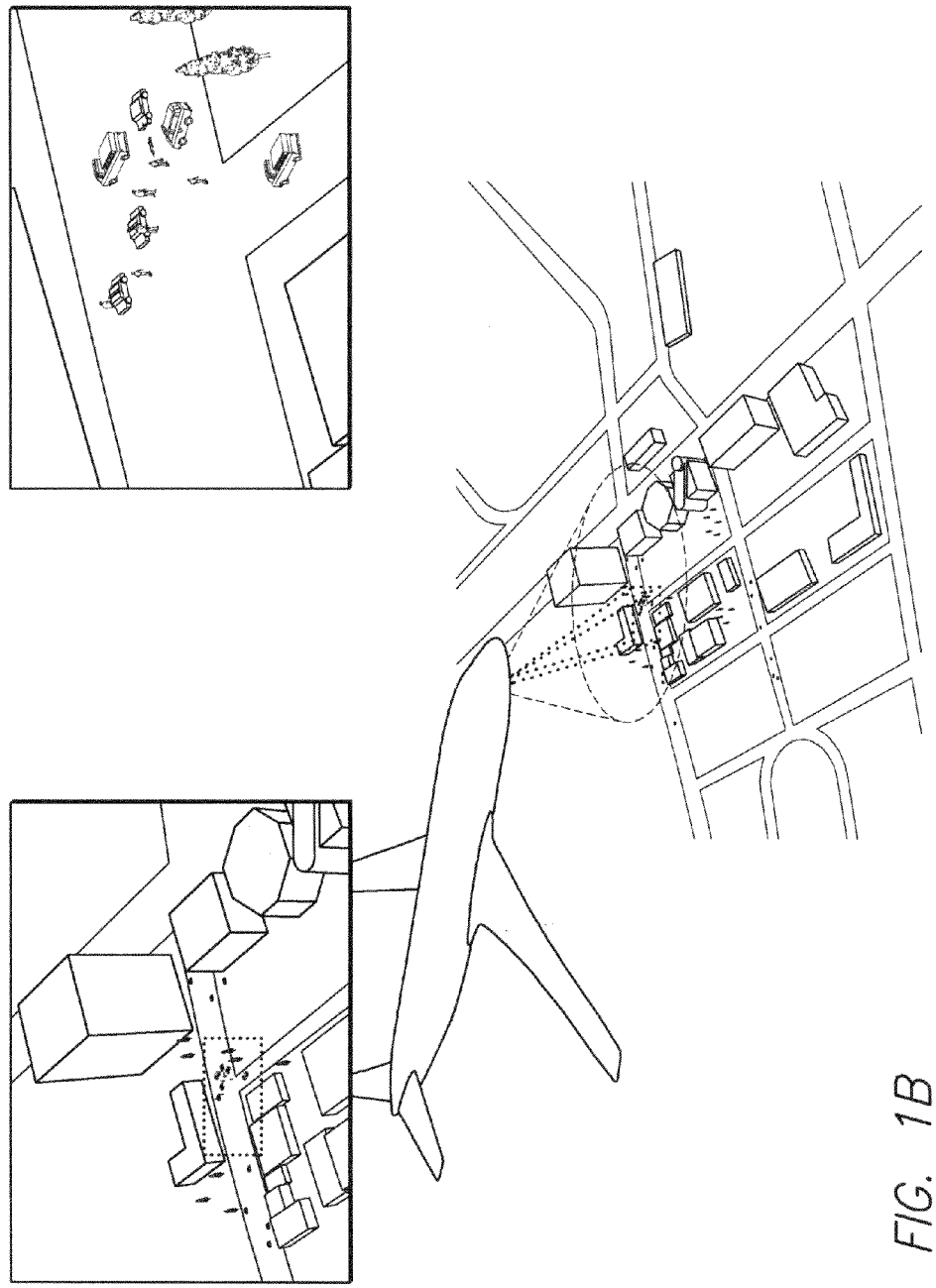
FIG. 1b shows urban emergency-service monitoring, with paramedics and ambulance(s)
Figure 1C:
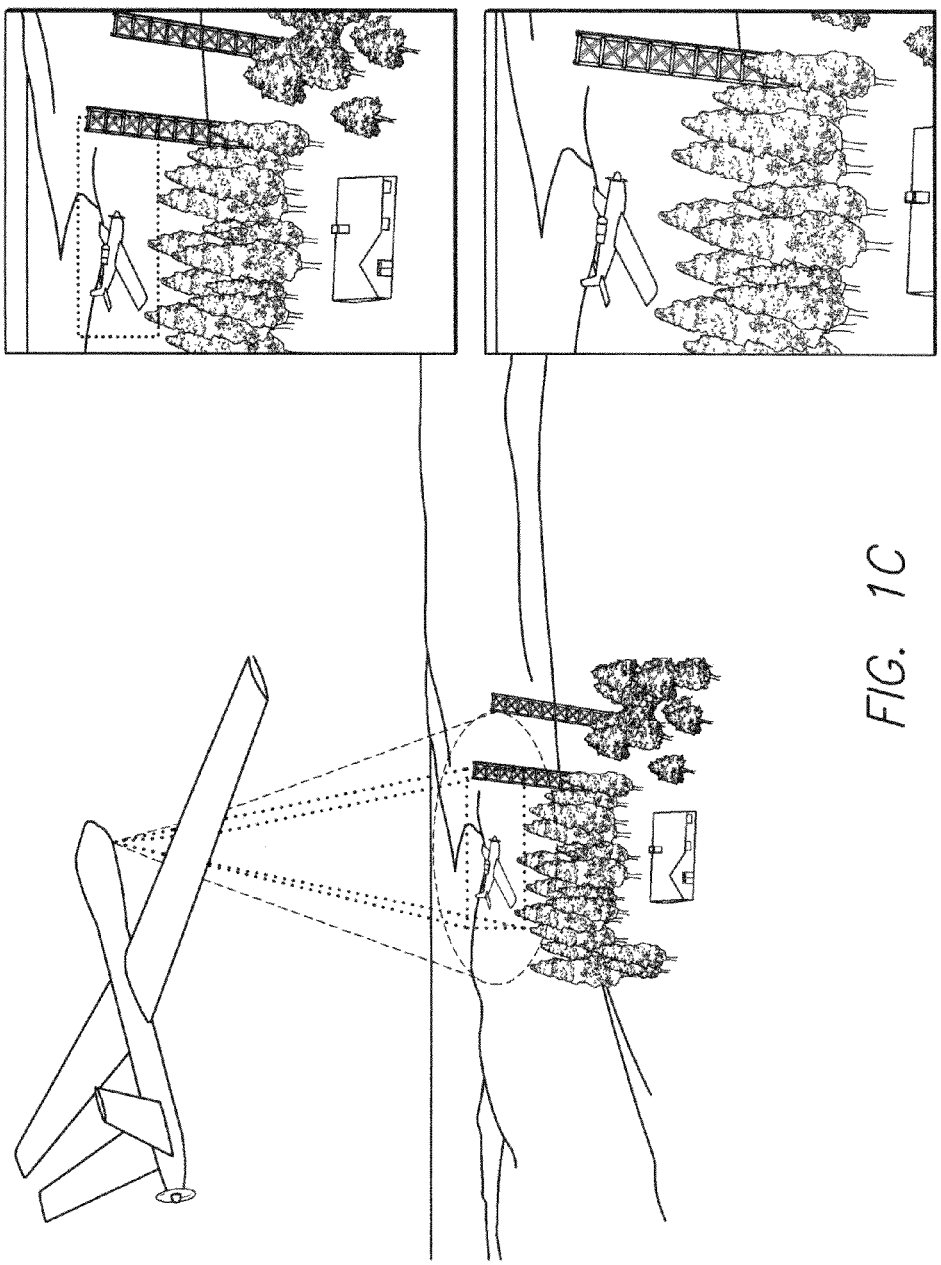
FIG. 1c shows commercial-airliner air-traffic control, wherein control has failed and an aircraft has gone down.
Figure 1D:
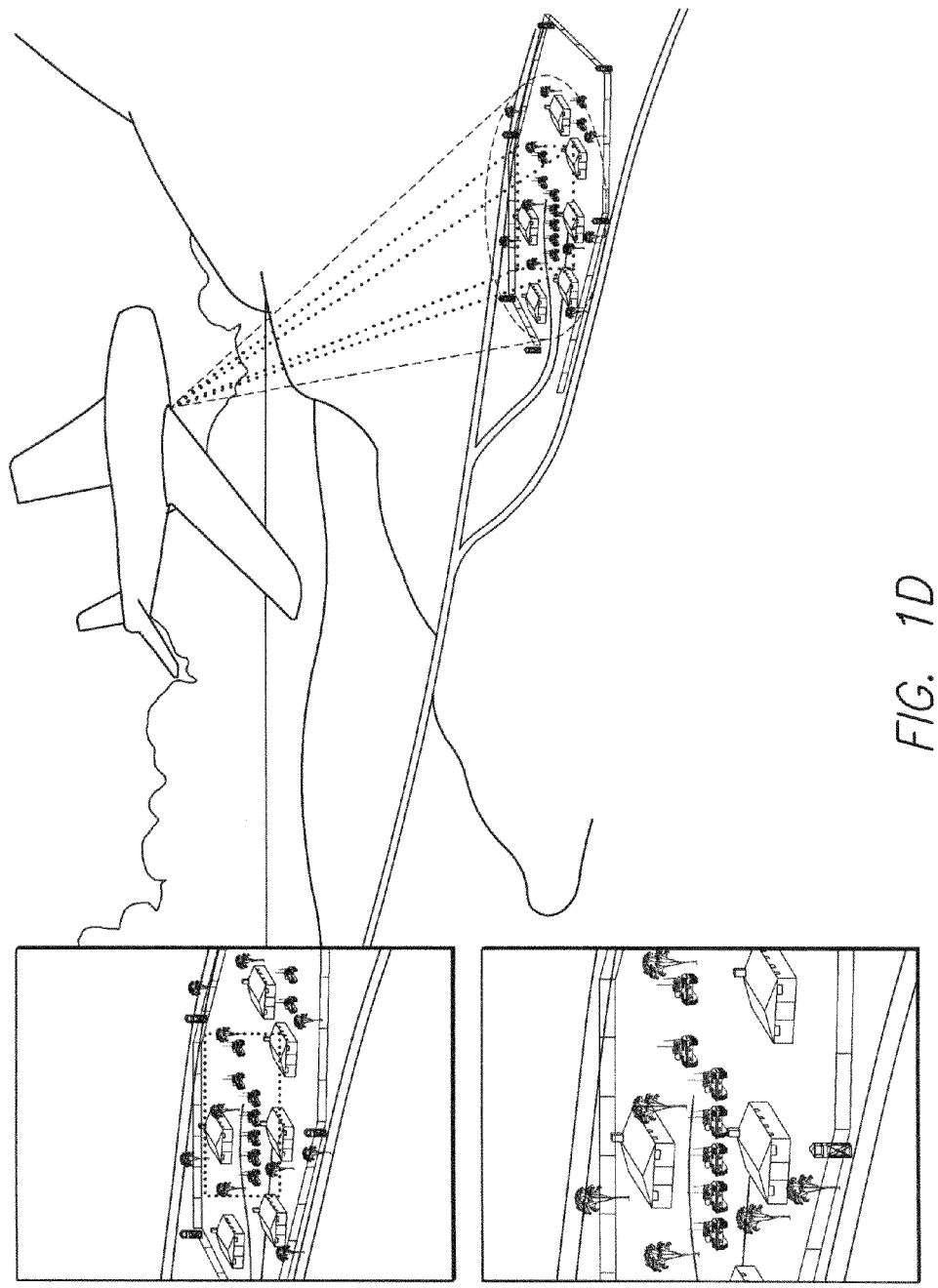
Figure 1E:
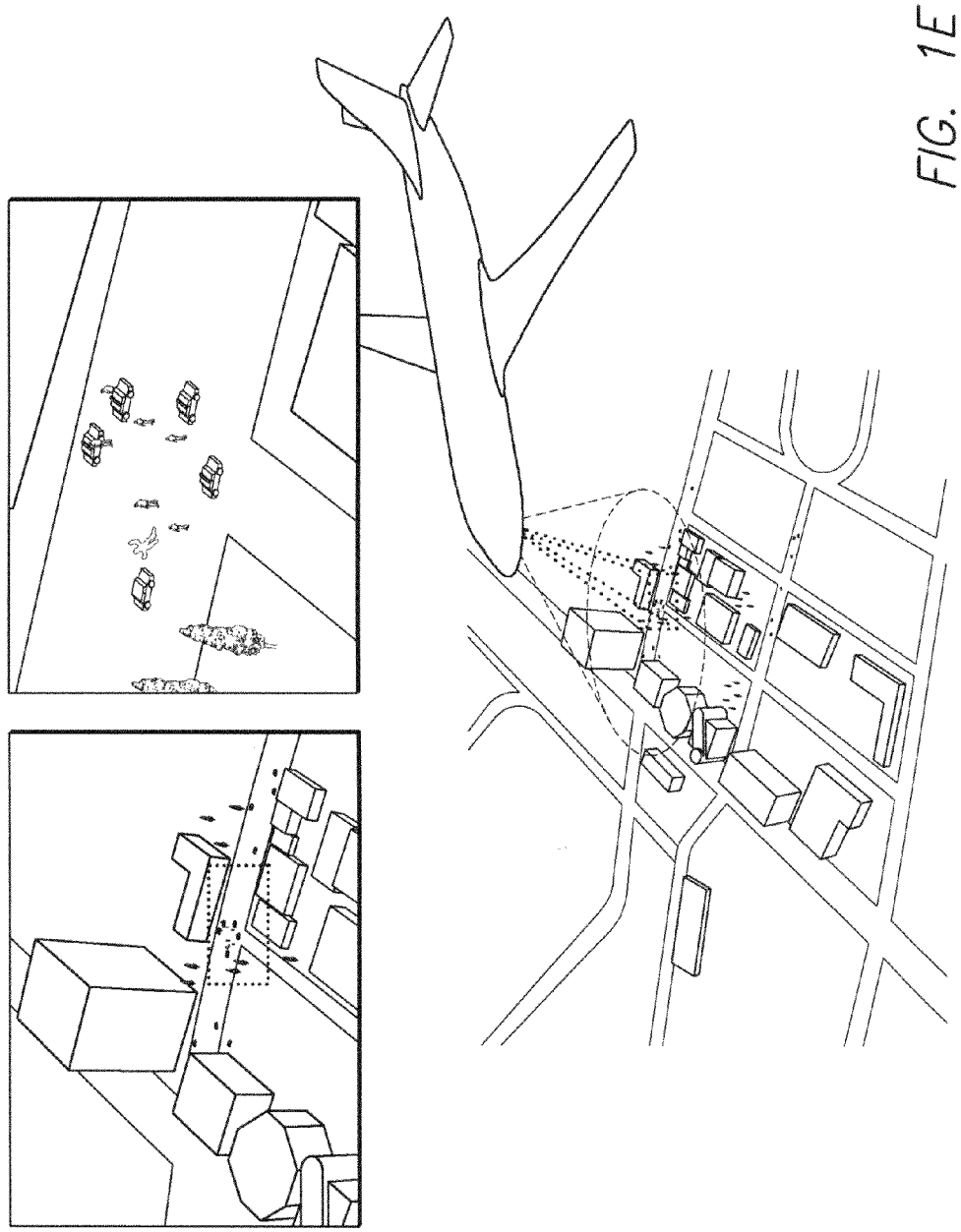
FIG. 1e shows urban police-activity monitoring.
Figure 1F:
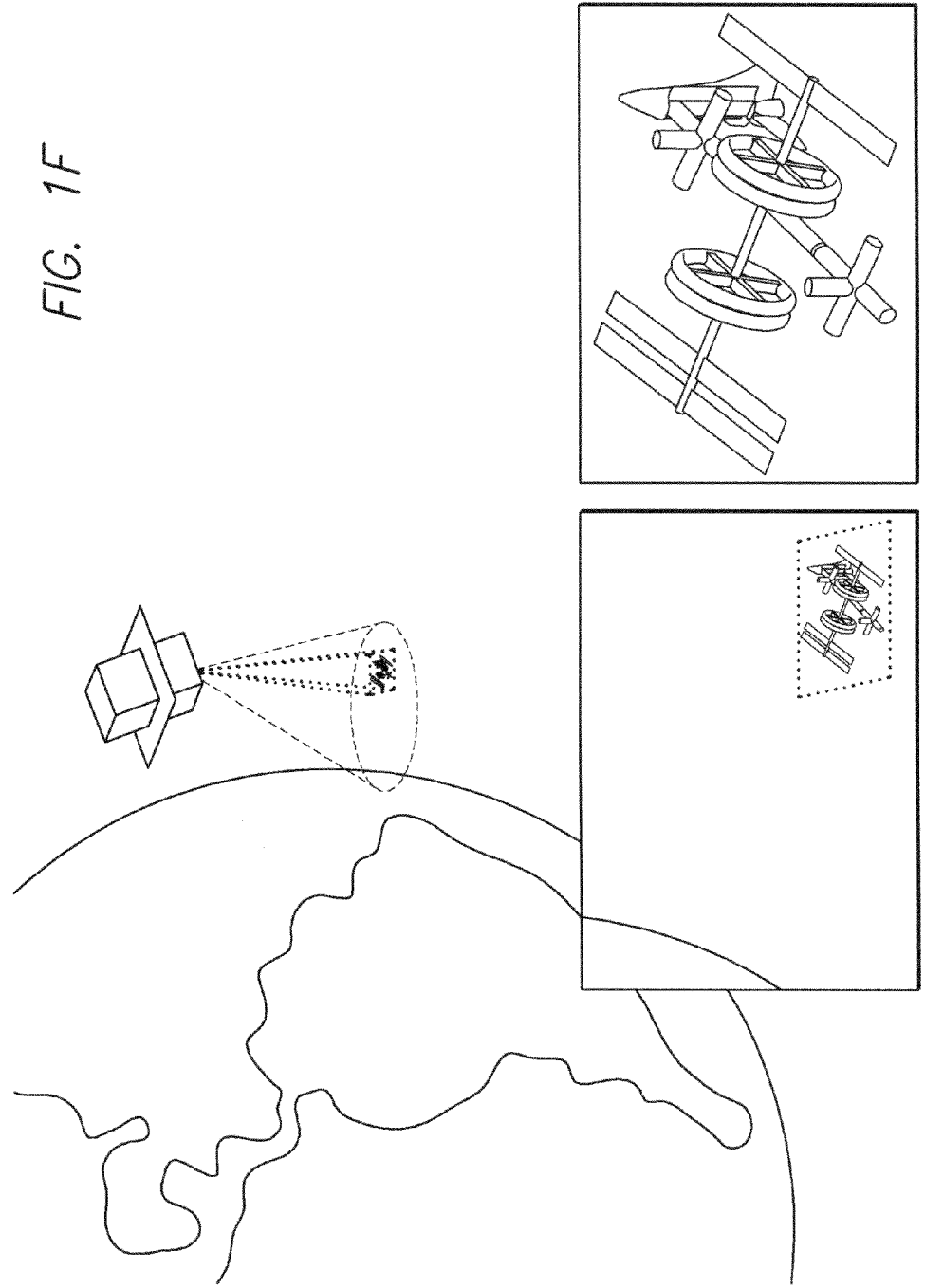
FIG. 1f shows spaceflight rendezvous—a shuttle docking at a space station.

Resulting capabilities enable e.g. commercial air traffic systems (FIGS. 1*a*, 1*c*), astronautical operations (FIG. 1*f*), military agencies (FIG. 1*d*), police procedures (FIG. 1*e*) and emergency personnel (FIG. 1*b*) to enjoy very greatly enhanced but low-cost imaging—including persistent surveillance and targeting. Advancing imaging, using electronically addressable pointing and optronic zoom imaging capability, without a gimbal, provides the basis for lightweight, low-power, reliable imaging performance.

In preferred embodiments of the invention the objective system is capable of pointing over a full-hemispherical field of regard (FOR) and provides a variable field of view (FOV)—with three times to twelve times (3× to 12×) optronic zoom—i.e., electronically controlled optical zoom. Concurrently the invention delivers geolocation information, based on platform position and attitude derived from an inertial-navigation system ("INS").

As will be seen, however, the use of liquid or diffractive commandable lenses as described above, is not a requirement of the present invention. Variable-focus technology is being and will be developed using a wide variety of approaches, e.g. electrowetting liquid lenses, microfluidic liquid lenses, flexible polymer lenses, liquid-crystal diffractive lenses, and technologies yet unknown. In principle the desired zoom capability need not be based on any variable-power lens technology but can even be a conventional zoom lens with mechanical motion, i.e. translating elements.

The most-highly preferred embodiment of our invention utilizes an afocal optical front end with a hemispherical FOR. In this approach servoed-beam steering—according to the coowned patent documents noted above—provides active pointing capability within the FOR, and active imaging optics provide variable FOV or zoom. For reasons related to complexity and maturity, liquid-lens and active-diffractive-lens technology show the greatest near-term potential for low-cost capability relative to other technologies. Table 1 offers a comparison of the current states of these two technologies. Both systems have been driven by commercial markets, but for specific unrelated applications as mentioned earlier in the "BACKGROUND" section—liquid-lens development by the cell-phone camera market, and active-diffractive lens development by ophthalmic applications (active eyewear).

Both show great promise. As between the two, according to our invention a choice for selection in the most highly preferred embodiment should be made following detailed preliminary design work specifically focused on the particular practical application of the invention that is to be constructed and operated. Thus for example spaceflight constraints may well favor a different zoom subsystem than military applications or commercial-aircraft considerations.

TABLE 1

Comparison of two competing active optical technologies for use in preferred embodiments of the invention.

| Parameter | Liquid lens | Active diffractive lens |
|---|---|---|
| vibration & shock | resistant | immune |
| aperture | limited | large |
| power | low | low |
| WFE | excellent | excellent |
| MTF (modul'n Xfer fn.) | excellent | excellent |

TABLE 1-continued

Comparison of two competing active optical technologies for use in preferred embodiments of the invention.

| Parameter | Liquid lens | Active diffractive lens |
|---|---|---|
| optical power | excellent (20 diopters) | fair (2 diopters demonstrated) |
| response time | good (<500 ms) | fair (<1 sec) |
| diffraction efficiency | n/a (97% trans.) | very good (90% demonstrated) |

On the other hand, there is reason to believe that the best solution for the zoom design will not be to choose one or the other, but rather a hybrid approach. For example, active diffractive elements are likely to be preferred where a needed optic should be a larger-aperture unit; but a liquid lens, for a smaller one. Since an active diffractive lens typically can have a fixed number of Fresnel zones, it is most naturally implemented with discrete optical powers—leading to a zoom capability that switches or steps among discrete magnification levels.

Inclusion of the liquid lens, however, introduces analog control and thereby enables a zoom feature that is continuous. The benefit of the scalable size of diffractive elements, combined with the continuous nature of the optical power of the liquid lens technology provides—in effect—a large-aperture, continuous-zoom design.

A variety of new capabilities will result from development of our invention, because it can provide to an operator simultaneous images of a critical region (whether a spaceflight environment, a multilane highway with many independent vehicles, or a battlefield)—including both wide-FOV images and high-resolution, narrow-FOV images. As will be explained shortly, various relationships can be established between the wide- and narrow-FOV images. We refer to this technology as "roving foveal imaging".

The term "foveal" refers to the high-resolution portion of the human retina, particularly the portion at the center of the retina. A related phrase is "foveated camera".

According to preferred embodiments of our invention, a roving foveal camera—consisting of two or more detector planes corresponding to a wide field of view ("WFOV") and a steerable narrow field of view ("NFOV")—can be designed using an appropriately configured optical system, an optical beam splitter and a fast steering mirror. In preferred embodiments of the invention there are now three basic configurations:

1. A WFOV camera (FIG. 2a, lower view) is optically (physically) separate from a foveal NFOV system (upper view) but is coaligned—so that the WFOV imagery can be correlated with the NFOV foveated images for tracking or image-processing purposes.

2. WFOV and NFOV imagers can share a common optical aperture using a beam splitter (e.g. a 50/50 splitter), allowing the optical radiation to traverse different pathways correspondingly to the two imagers respectively. Within this class there are two different configurations:

a. The WFOV image (FIG. 2b) is picked off before the fast steering mirror, making its FOV movable in relation to the NFOV. This allows the NFOV high-resolution imager to "roam" or "rove" the WFOV image space. This mode of operation (as well as, therefore, this optical configuration) is now the most highly preferred embodiment, since it gives an operator or system designer maximum flexibility to juxtapose the plural scene views as desired for optimum information content.

b. The WFOV image (FIG. 2c) is instead split out after the fast steering mirror, making the WFOV and NFOV static relative to each other. That is, the high-resolution NFOV image remains wherever placed—e.g. centered—relative to the WFOV, so that when the mirror is moved both scene images move together. Thus if the NFOV is centered in the WFOV, substantially as in the human eye, the system provides low-resolution peripheral vision with higher-resolution central vision—even as the overall system is being redirected.

In none of these embodiments is the system limited to two channels—i.e., to one wider and one narrower channel. Rather, the number of NFOV channels and the magnification in each channel, respectively, are highly variable (and can be made in is essence arbitrary) at the preference of the operator or system designer.

Such adjustability, starting with the freedom to insert additional channel pick-off hardware, will be recognized upon review of the geometries diagramed, and the foregoing discussions of the three configurations. People skilled in this field will appreciate that different operators will have strikingly different capabilities for organizing, and for visually and mentally following, complex motions in different parts of the screen display—and accordingly will have very different preferences for use of the variants described in this paragraph.

In all cases the detector array can be sensitive to any optical wavelength, and it can be multispectral—and therefore only limited by the availability of specific detector arrays (now and in the future). Additionally, the optical front end may if desired include an afocal lens, most typically but not necessarily wide-angle.

As in the coowned prior patent documents mentioned above, the afocal front end if present can be used to obtain large FOV angles unachievable with the mirror alone (i.e., for steering mirrors that have an angular limit).

With wide-FOV images an operator can maintain overall situational awareness of a relatively broad or overall region, while simultaneously interrogating narrow-FOV regions. Given that a goal is to make the system smaller and more affordable, the invention will have greatest appeal wherever naturally wide- and narrow-FOV scenes of interest are intermingled.

As a consequence, new ways to utilize this technology in a collective and networked environment will be realized. This plan for use of the present invention provides an alternative to the large, concentrated or centralized, high-value-asset approach—and the possibility of equal or even greater operational capability being met within a distributed, low-value-asset approach.

Particularly for portable (including military) applications, preferred embodiments of the invention include a small (e.g. 50 to 500 cubic centimeters), lightweight (e.g. 0.25 to 2.5 kg) sensor technology with dynamically allocable FOV and magnification. In vehicular applications, such a package is ideal for use with a small unmanned vehicle, for instance most typically one weighing roughly 2 to 8 kg, with a payload capability of very roughly one-half to five pounds—though the invention is by no means limited to such use.

Advancing imaging technology, with electronically addressable pointing and optronic zoom imaging (without the large external gimbal box of older conventional systems), provides the basis for such lightweight, low-power, and reliable imaging.

According to our invention the objective system can point over a hemispherical field-of-regard (FOR) and provide a variable field of view (FOV) with 3× to 12× optronic zoom while delivering geolocation/targeting information based—as mentioned earlier—on INS knowledge of platform position and pointing. Such a system can provide enhanced low-cost imaging and pointing capability. As a consequence we expect the proliferation of such a capability to change the manner in which operations are conducted in all of the different fields of application.

Such a preferred embodiment most-preferably takes the form of a roving foveal sensor capable of simultaneously viewing a wide FOV and a narrow FOV—and generating corresponding output images. The wide-FOV image is advantageously used to identify and follow a region of interest ("ROI"), for e.g. situational awareness, while the variable zoom narrow-FOV image provides high-resolution data and visible close-up views for finer investigation and analysis.

As noted earlier, we anticipate that a variety of new capabilities will result from thus providing an operator with simultaneous plural-resolution imagery for a region of interest. From an operational perspective, either onboard or ground-station processing may be used to identify ROIs based on a variety of criteria. For example, advantageously a moving-target indicator can be used to identify an ROI needing further interrogation.

Other ROIs may be based on recognition criteria, such as manmade structures, vehicles, or even particular identifiable groups of people (e.g., in a military context, enemy combatants). Regardless of the criteria, a wide variety of ROIs may be simultaneously followed in the wide-FOV imagery while the narrow-FOV view or views are used to rapidly analyze the individual ROIs or to generate specialized details—or simply to afford a real-time telephoto view to operators.

Depending on the task, the narrow-FOV images may yield information peculiar to achieving a specific goal. For instance actual identification of an object—by either autonomous or man-in-the-loop methods—can be greatly enhanced by virtue of finer-resolution imagery from the narrow-FOV sensor; however, beneficial uses are not at all limited to object recognition. Broader-area continued imaging (an overview such as multiple spacecraft in their geometrical interrelationships, or such as military reconnaissance) clearly benefits as well. In general, monitoring a very wide region while simultaneously acquiring high-resolution, ROI images provides information that is either unobtainable from other platforms or would require multiple platforms to obtain.

Because preferred embodiments of our invention integrate feedback from an onboard INS system, image stabilization is also possible. This typically is not available on small UAVs heretofore, since conventional stabilized imaging systems usually require gimbal systems that exceed weight limitations for these craft. The new stabilization and pointing capabilities in preferred embodiments of our low-weight, low-power package present a new set of possibilities for a great range of users—including but not limited to (as one extreme example) air-traffic controllers in a tower or a regional control facility, and (at an opposite extreme) soldiers on a battlefield. More specifically to military applications, persistent surveillance and tracking of a specified target are new capabilities not found on current Class 1 or Class 2 UAVs.

Furthermore the simple provision of image stabilization facilitates analysis by ground operators and mitigates mental processing demands for interpreting imagery. Finally, integration of the pointing system with the INS enables object-locating capability (geolocation) within our small platform. Accuracy of geolocation is based on the accuracy of platform orientation (INS accuracy), and of platform position (INS and for some applications an altimeter), and pointing accuracy.

Our invention contemplates sensor pointing accuracy on the order of 0.1 mrad. For moderate INS performance of 7 mrad attitude precision and 5 m positional precision (e.g. so-called "spherical error probable" or "SEP"), this implies approximately 8.5 m pointing precision (e.g. "circular error probable" or "CEP") at 1 km ranges, in a plane perpendicular to the line of sight. This type of pointing location may be used in a variety of ways, for example:

- object coordinates may be handed off to another platform or facility to perform any one of a wide range of application objectives;
- in applications requiring an immediate rapid response (e.g. collision-avoidance or military contexts) a course correction or a direct call for fire may occur; or
- information may be simply cached for application planning purposes to be performed at a later date.

For any new-capability innovation, new applications are often developed by the user community. As systems in accordance with our invention become smaller and more affordable, we expect them to become more numerous in many use environments such as mentioned in this document—and other environments as well. As a consequence, understanding ways in which to best utilize them in a collective and networked manner will also be recognized by people in these fields.

Preferred embodiments of our invention are compatible with a variety of alternative applications, in addition to those already introduced. One example includes replacing the afocal hemispherical optics with a panoramic annular lens, for stationary installations. In this case the system can provide a 360-degree panoramic overview, enhanced by addition of our NFOV sensor for rapid investigation and analysis of interesting regions identified by an operator.

Further Technical Details

The technical objectives of preferred embodiments are best derived from system objectives—e.g., a low-cost, lightweight (under 2 kg or 5 pounds), low-power, persistent visible and infrared imaging and pointing capability for UAVs. Our invention contemplates these system characteristics:

(1) fast optronic pointability,
(2) ±90-degree field-of-regard (FOR),
(3) 3× to 12× optronic zoom,
(4) wide FOV for broad-region imaging and continued monitoring,
(5) narrow FOV for pointing at and following relatively small objects or regions,
(6) image registration/stabilization and object geolocation, and
(7) passive visible and IR capability.

A basic design or baseline system has the plural-resolution characteristics described above—including a low-resolution image of the entire FOR and a simultaneous higher-resolution image of a narrow FOV anywhere within the FOR. As noted earlier, we denominate an imaging system with such properties a "roving foveal sensor". In preferred embodiments of our invention, the region captured by the "roving foveal" portion of the optics is determined by pointing a two-axis steering mirror to a region of interest within the FOR.

Our depicted design approach has several interesting benefits. First, simple changes in the optical layout provide different operational capabilities that may be tailored for specific applications.

For example, moving the wide-FOR staring sensor array to a position behind the steering mirror still maintains independent adjustment of the wide FOV independently of the FOR, and FOV motion controlled simply by the pointing of the mirror. This design mimics the behavior of the human eye, with the added feature of a variable-zoom foveal region.

Second, the design is not tied to any specific detector technology. This characteristic enables easy adaptation to newly developed detector-array technologies as they become available.

System Design

A key system-level objective, in implementing preferred embodiments of our invention, is to develop a detailed system design and a performance model exhibiting integrated performance that satisfies the above-mentioned descriptions. To avoid iterative efforts we recommend that, based on the system design, elements necessary for a prototype demonstration be developed. Specific goals of such a demonstration ideally include ability to perform not only zoom and pointing functions but also pointing stabilization using INS inputs to support geolocation, as stated earlier. Although individual subsystem specific performance measures (e.g., wavefront error ["WFE"], response time, modulation transfer function ["MTF"], stability, etc.) naturally should be determined individually, the overall system performance measurements noted here are best made in an operational context.

Elements at highest "risk" (in the sense of possibility that they may perhaps turn out, for some particular applications, to be infeasible or unsatisfactory) in implementation of our invention relate to development of the controllable optical elements which provide electronically actuated zoom—and, to a much lesser degree, the servoed steering. Accordingly we advise against performing integrated system-design work without first demonstrating the key technology components individually. Thus we recommend starting any design effort with work on only the servoed-steering and active-optics subsystems.

A much lower "risk"—but yet a major task and major design challenge—is design of the optical layout for the system. What is needed is an afocal wide-FOR design that produces images of sufficient quality to be operationally useful. Within this design-tradeoff space is consideration of the spectral region or regions of interest and, for visible-spectrum systems, the desire to color-correct the optical design. Since spectral bandwidth and color correction can entail major financial stakes, such decisions should be based firmly on overall system goals.

Figure 3:
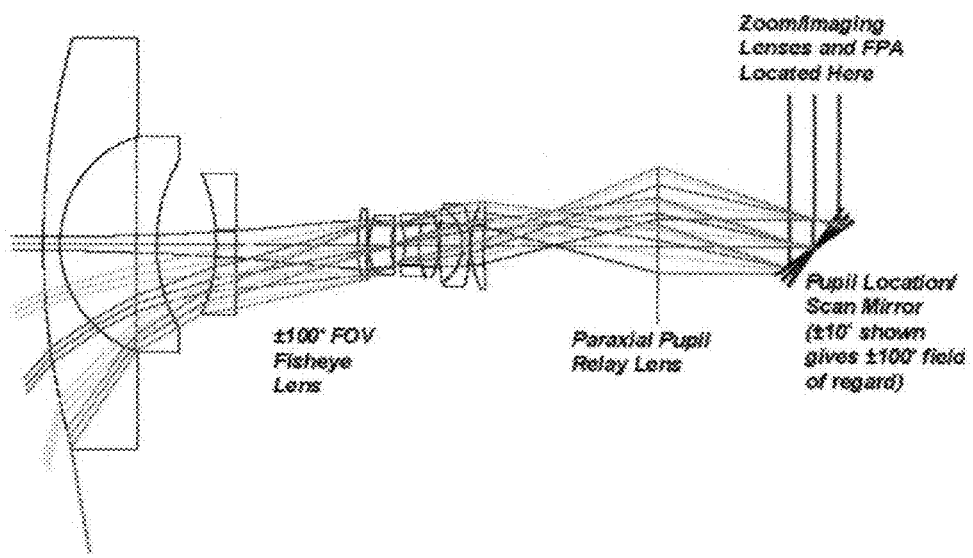
FIG. 3 is an exemplary optical design schematic of a color-corrected afocal optical system according to a preferred embodiment of the invention, for operation with visible light.

A representative color-corrected optical design (FIG. 3) has a ±10° scan angle for the two-axis servoed-mirror—and exemplifies some of the challenges faced with wide-FOV imaging. First, the effective entrance pupil of the system is compressed—which is a function of the angular magnification considered together with the clear aperture of the servoed mirror. Here the effective entrance pupil is on the order of 1 cm.

Another issue is related to the number of optical elements. A color-corrected system has a relatively large number of optical elements, and this adversely impacts both size and weight objectives. This problem can be alleviated by going to longer waves lengths, or imposing single-wavelength operation on the system—but such mitigations carry their own undesired limitations.

A final challenge exemplified by such an optical layout is the issue of adequate image quality. In this example the MTF of the system corresponds to roughly fifty line pairs per millimeter, which is usually the minimum acceptable resolution for a detector array with pixels of 10 μm pitch.

In the aggregate, such design constraints can be managed in only a limited number of ways. In the case of the effective entrance pupil, three factors can be traded-off in relation to the radiometric requirements: total FOR, servoed scan angle, and mirror size. Simplification of the design by specifying single-wavelength operation is also a reasonable consideration—provided, naturally, that quality color imaging is not required. Meeting image-quality requirements will, most typically, be a result of experienced optical-design efforts rather than rigorous scientific methods; however, our design goal of fifty line pairs per millimeter should be reasonably easy to meet, given the performance of the design under discussion.

Design of the zoom imaging subsystem will provide additional key subsystem requirements. We trust initial design-feasibility analysis based on simple thin-lens equations, for two fixed optical elements separated by a fixed distance D. The expression that describes the effective focal length ("EFL") of such a system is defined through the relation:

$$P=1/EFL=P_1+P_2-P_1P_2D, \quad (1)$$

where P is the effective optical power of the lens combination and P1 and P2 are the optical powers of the individual lens elements. For fixed electronically-active lenses the conserved quantity is location of the effective focal point (detector plane). The distance D* from the second lens, P2, to the detector array is given by:

$$D^-=EFL-D(P_1/P) \quad (2)$$

and is the conserved quantity of the system. The zoom value for the system is defined as the ratio of the effective focal lengths for different selections of the individual optical powers. Although this relatively simple approach provides a useful design point, we recommend also considering more-complicated designs that take into account realistic constraints such as aperture and detector size.

Figure 4:
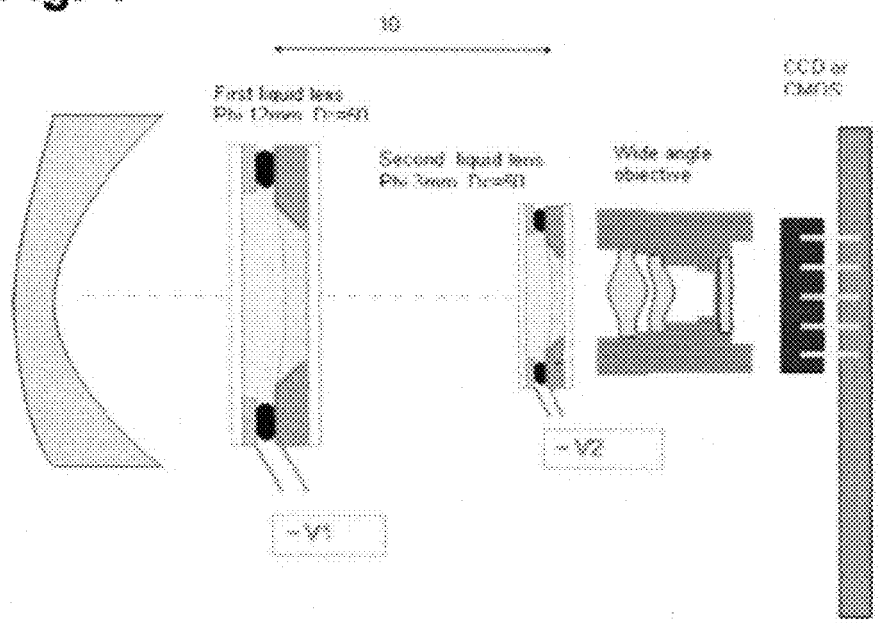
FIG. 4 is an optical schematic (after Varioptic) of a zoom lens constructed using two variable-focus liquid lenses (in combination with a wide-angle objective) and providing a maximum two-times ("2×") electronic-zoom capability.

Thus one exemplary preferred embodiment of the invention uses variable-focus liquid lenses (FIG. 4). A maximum two-times ("2×") electronic-zoom capability is provided.

Detailed designs of this nature should be explored to provide requirements flow-down to the active optical-element development effort. Key parameters of interest are the diameter of each active optical element and the optical power required to achieve the design goal of 3× to 12× variable zoom.

As suggested above, we recommend that after design the system be modeled to verify that the design meets all objective and inferred requirements, such as radiometric properties and platform vibration. Although typically a prototype system is intended as a laboratory demonstration unit (e.g., breadboard unit) only, and not expected to be integrated onto a platform, ideally the design will show traceability to achieving target geolocation capabilities. This is best demonstrated and quantified through analysis in which pointing feedback of the MEMS-mirror position is combined with the platform attitude, global position and knowledge of the local terrain to provide an estimate of an object's coordinates.

The primary function of the servoed-beam-steering subsystem is to provide pointing stabilization using INS inputs, to support image-based tracking functions. To that end the main objectives of the servoed-beam-steering task are to demonstrate a compact, low-power beam-steering package that can provide appropriate angular deflection and pointing accuracy for system requirements. It is further advisable to demonstrate closed-loop control of the servoed device, to provide active inertial stabilization of the imaging system under realistic platform dynamics.

The previously mentioned CatsEye™ laser threat-warning program and our present development activities have led to current preference for an octagonal, electromagnetically driven mirror assembly with an aperture of 1 cm (FIGS. 5 and 6A) or 2 to 3 cm, and even greater. The mirror may be a micromechanical type, e.g. MEMS with torsional flexures as illustrated, or preferably jewel bearings. The approach currently pursued has demonstrated mechanical dynamic range of ±22 degrees, utilizing a PSD mirror-position sensor for active positional feedback. This design provides the necessary accuracy and dynamic range for image stabilization and pointing, in the proposed system. A similar unit with a 1 cm square aperture (FIG. 6A) has successfully demonstrated two-axis, large-angle beam deflection, and mechanical improvements—in addition to the square aperture—optimize spring stiffness.

Our early research and development work particularly explored the use of Hall-effect sensors to provide positional feedback for the mirror-steering control system. Although Hall sensors initially appeared to show great promise, after extensive effort we have concluded that other sensor types are far more suitable. The Hall-effect devices we investigated had only four-bit resolution, not at all adequate; and furthermore were subject to very objectionable crosstalk—on account of their sensitivity to signals in the mirror-drive coils.

We have been much more satisfied with use of position-sensing detectors (PSDs) to monitor mirror position. Such a sensing strategy can be straightforwardly implemented in a system using our jewel-bearing mirror mount—especially since in that case we have access to the back side of the steering mirror. A separate mirror-monitoring light beam is deflected by the back of the mirror, depending on the mirror angle, and reaches a PSD dedicated to monitoring mirror position. (In principle such a system can instead use the front of the mirror if preferred, but such an arrangement is sometimes partly incompatible with the best use of the front of the mirror for deflecting the imaging or pointing beam.) The mirror-position monitoring path typically has its own radiation source, and the system reads PSD output signals directly to determine the actual position on the PSD that is struck by the beam.

The PSD under discussion here is not the same detector used to measure object direction or system-pointing direction, and in this (mirror-position measuring) situation it is permissible to measure beam position off-axis relative to the detector, even though these units are more and more nonlinear in position as an incident beam spot is successively farther from center. Linearity is not critical here, as the calibrating relationship between mirror angle and PSD spot position can be rather fully characterized. Null-balance operation is very precise and accurate, but is not required to calibrate the mirror angles very adequately.

In regard to the above discussion of aperture size, our selection of a 1 cm aperture is intended as representative rather than as a maximum size. As explained in one of the coowned prior patent documents mentioned earlier, we regard mirror sizes on the order of 2 cm, 3 cm and more as practical and desirable.

Mirrors of such sizes, however, are not at all limited to the torsional-flexure monosilicon constructions introduced in that document. To the contrary, the larger mirrors are implemented even more effectively in the jewel-bearing embodiment of another of our above-introduced patent documents. We have found that the jewel-bearing embodiment is far superior in control-response bandwidth, angular-setting stability when the mirror is not held in position by the control system, and related dynamic characteristics.

In addition, it appears that the larger mirrors as designed and used in our jewel-bearing mounts can remain significantly more planar in operation than the torsional-flexure units. In the latter devices, mirrors are bodily bent, in the direction of pointing. Therefore in our jewel-bearing device a much larger fraction of a radiation beam steered from the jewel-bearing device is actually pointed in the nominal direction and reaches the nominal position.

Again, as further detailed in our previous patent document dealing with the jewel-bearing system, performance of that system is much better than the MEMS and other monosilicon options. This is true in regard to response bandwidth, mirror planarity, directional controllability, linearity of directional adjustments, and stability of mirror direction when the control signals are removed.

If monosilicon components with torsional flexures are nevertheless preferred, a relatively simple process can be used to fabricate our servoed mirrors, requiring only three photo steps. The starting material is a thick silicon-on-insulator ("SOI") wafer layer—on a 300 μm handle wafer, separated by 1 μm of oxide. A metal mirror is deposited by sputtering and liftoff. Inductively coupled plasma ("ICP") etching steps define the mirror, springs, and gimbal. A second plasma-etching step removes the handle wafer so that the mirror can move. The thickness of the springs and mirror is established by the thickness of the starting SOI material. A magnet (preferably a permanent magnet) inserted in a cavity in the silicon mirror enables light-deflecting actuation about two axes by a set of four drive coils.

Positional feedback sensing for the mirror comes from the output of sensors such as PSDs, as described above, so that the deflection angle is determined by monitoring mirror-control signals. Sensitivity for this feedback is related to the operating principle of the sensor and the above-mentioned mirror drive magnet. Full understanding of the feedback-sensitivity subsystem is a primary determinant of potential overall system performance.

There is some risk that for some imaging applications the mirrors may not perform as expected. For example, they may not rotate as far as desired or may be too fragile for a high-shock and -vibration environment—even after flexure optimization. Additionally, the feedback sensors may not give sufficient positional accuracy for adequate closed-loop mirror control. To ads dress these risks, we recommend initially fabricating a 10 mm servoed mirror and fully characterizing its performance. Of specific interest is demonstrating hemispherical pointing in both open- and closed-control-loop environments.

Also highly advisable is characterizing the sensor performance to optimize mirror positional feedback. Additionally, step-stare capability should be demonstrated in the laboratory to characterize imaging-stability requirements. Based on these performance results, design changes can be developed for production servoed mirrors.

Figure 7:
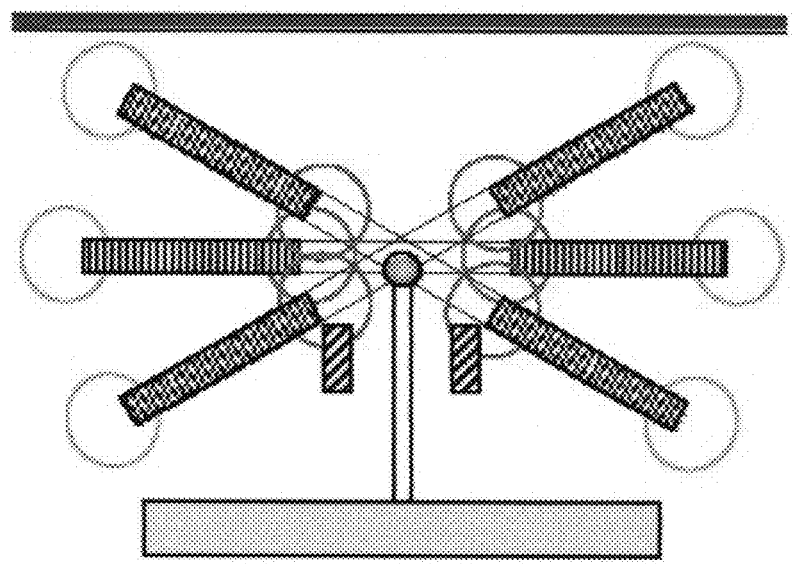
FIG. 7 is a diagram, highly schematic, of a new alternative servoed-steering-mirror design that has an added ball joint for suspension—with outboard circles representing regions of high magnetic field in the precursor (i.e. current) design, and inboard circles showing regions of newly increased magnetic field in this design.

Several improvements have already been considered in anticipation of potential problems in our current most-highly-preferred servoed-beam-steering design. It is a major departure from earlier embodiments that relied on the "large mirrors" patent document listed above, or on the Draper-style mirror concepts. In the latter context for example, a minor design change can simultaneously impact vibration and shock concerns, along with sensor feedback sensitivity and accuracy. In those earlier embodiments, simply placing a hole in the permanent magnet that was mounted behind the mirror provided for the possibility of including ball-joint suspension (FIG. 7) while simultaneously increasing the magnetic field near the sensors.

Here regions marked by outboard circles represent relatively low magnetic fields in such precursor designs, whereas the inboard circles show how the magnetic field increased near the sensor—leading to increased mirror-position accuracy for some sensor types. Because of the ball-joint suspension, this design might have required an alternative sensor approach: the ball-joint post might have interfered with installation of some types of mirror-position sensors.

Essentially all these concerns disappear or are very strongly mitigated in our current jewel-bearing, nonmonosilicon, and nonMEMS embodiments. We recommend careful consideration of all recognized alternatives.

Demonstrating performance at the system level entails tests of so-called "persistent surveillance tracking" (step-stare and platform dynamics) with INS feedback. Such investigation can be conducted in the laboratory with simulated platform motion. Specifically, it is helpful to integrate signals from mirror-position sensors with inertial data.

One low-risk approach to achieving this goal is to first establish open-loop control of the mirrors (i.e. without using mirror-feedback sensors). Hemispherical beam steering can then be demonstrated, with ability to project a beam through a commercial wide-FOV afocal lens to achieve the hemispherical beam steering, through integration of a simple visible laser. The is next objective should be closing the pointing control loop. In a laboratory environment with the system mounted to a stationary platform, closed-loop control and stability can be characterized easily.

A final step can be incorporating the inertial-sensor feedback, to demonstrate closed-loop stabilization relative to an inertial reference frame. Mounting the system on a platform with known vibration dynamics can facilitate obtaining full characterization of the inertially stabilized system. Although it is a salutary design goal to achieve mirror-pointing precision better than 0.1 mrad, this objective may overconstrain the problem—in the sense that inertial stabilization errors will be a combination of the mirror-pointing stability plus the INS performance capability. Typical INS systems used on small UAVs tend to have attitude accuracies on the order of 5 to 7 mrad, and update rates of roughly 50 to 100 Hz. Such issues should be thoroughly investigated during development.

Other Applications of Our Current Mirror Refinements

As will be clear, the principal thrust of the present invention relates to roving foveal camera embodiments. Our very noteworthy current improvements in steering mirrors, however, also have extremely important inventive aspects in applications involving other kinds of devices than foveal cameras.

As noted above, these steering-mirror advances include development of much larger mirrors than heretofore thought feasible for high-bandwidth, low-power and low-weight systems needing good mirror planarity, good directional controllability, and reasonable linearity of directional adjustments—and particularly such mirrors of the jewel-bearing type (as well as, secondarily, the etched monosilicon types). In our jewel-bearing mirrors, again, we are perfecting units of size up to 2 and 3 cm and even higher.

More generally our current inventive work emphasizes mirror types of a much greater variety than in our earlier investigations. Those earlier efforts, to a large degree, pursued system designs using MEMS-type mirrors, as well as monosilicon etched planar structures with integral torsional flexures (or "hinges") serving as gimbals. Thus the present invention partly consists of introducing very large nonMEMS mirrors, nonplanar-silicon etched mirrors, and nontorsional-flexure steering mirrors.

Other aspects of the present invention, however, include very different applications of these same newer large steering mirrors (i.e. preferably not MEMS and not planar monosilicon etched structures, and not featuring integral torsional flexures). These new and different applications in particular include uses of these mirrors in lidar systems, and in other types of active optical systems, and in many other kinds of optical systems based on null-balance operation of the mirror steering apparatus. Many such systems, for instance, are systems for noticing and optically following objects outside the optical system, as set forth in several of our coowned patent documents listed at the beginning of this present document.

Some of those earlier systems include provision of a "return" beam, directed toward an external object for purposes of dazzling its operators or associated automatic equipment, or even for impairing its structure or function; others include provision for spectral analysis of radiation from the noticed and followed external object; and still others are for imaging of a noticed and followed external object or group of objects. Others include an afocal element that enlarges the field of view or field of regard, or both, for enhancement of those object-noticing and following inventions. Thus our current mirror developments are especially effective when plowed back into our earlier system interests to further refine and advance such systems.

All these advances are thus valuable and are especially important aspects of improved mirrors according to our present invention. The present document, taking into consideration the several coowned (and wholly incorporated by reference) patent documents mentioned above, does explain how to obtain the desired response bandwidth, low-power and low-weight modules with good mirror planarity, directional controllability, and reasonable linearity of directional adjustments. This document establishes such aspects as parts of the present invention.

Active Lens

The invention leverages two recent technological breakthroughs, in unrelated fields: electrowetting-based lens technology, and high-efficiency active diffractive optics technology. Either of these approaches, or a combination of both, provides the basis for an optronically driven zoom capability—i.e. an all-optical zoom capability with no mechanical parts.

Figure 8:
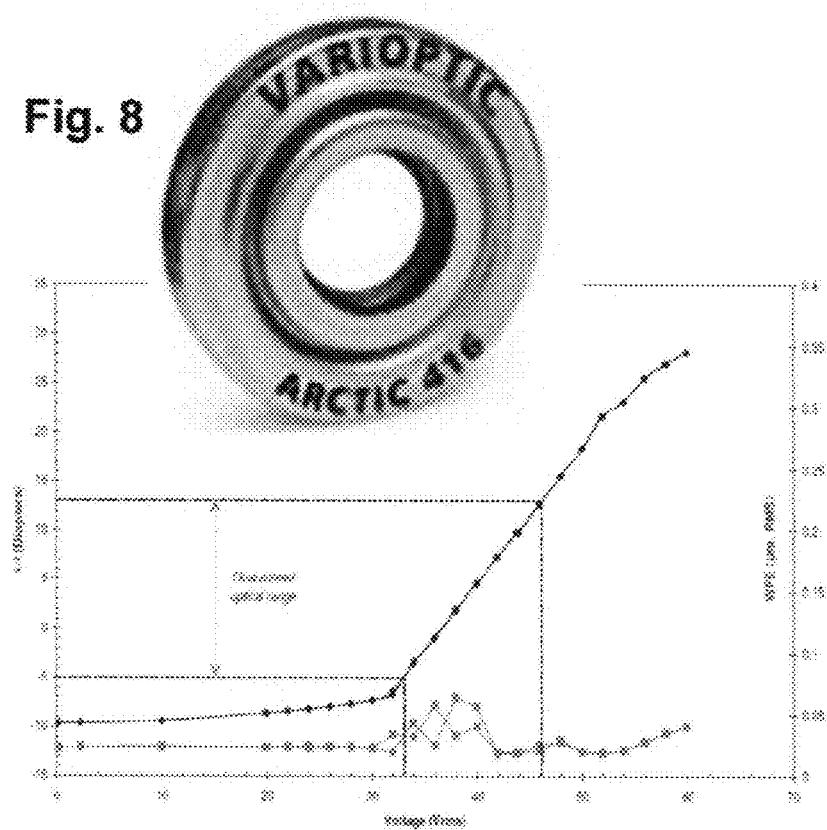
FIG. 8 is a composite (after Varioptic) including a perspective view of Varioptic's liquid lens, and a graph of optical power and wavefront error ("WFE") as a function of applied voltage.

Within active optic technology, liquid lenses based on the principles of electrowetting have progressed far in commercial applications, e.g. Varioptic's 2.3 mm lens (FIG. 8). Major advantages of these liquid lenses come from their small electrical dissipation, reduced size, and long lifetime under voltage cycling (due to absence of mechanical parts).

Performance of these devices has been well characterized and appears very satisfactory, at least for visible-spectrum applications of our invention. Challenges related to aperture size and IR nonmiscible-fluid properties and availability are some of the determining factors for future applicability of this technology.

An alternative active optical approach is based on the use of nematic liquid crystals to implement switchable diffractive lenses. Historically, for a variety of reasons, efforts to develop this technology have met with limited success. In some cases thickness of the liquid-crystal layers (over 400 µm) made their response and recovery times long—and, because of optical scattering, their transmission low.

Although high-efficiency liquid-crystal-based diffractive devices have been demonstrated for beam steering, less effort has been given to imaging applications. Recently, however, as noted above, the University of Arizona has developed a photolithographically patterned thin diffractive lens with large aperture, fast response time, and a power-safe configuration for ophthalmic applications.

These two technical approaches formed a basis for our own innovations incorporating active-lens technology into foveal imaging. Both approaches should be investigated during preliminary system design. Existing liquid-lens technology currently used in the cellular-telephone camera market should be examined and characterized for applicability to the present invention. Detailed consideration of the University of Arizona's active diffractive optical element is also advisable.

Results of such efforts will lead to a solid technical basis for completion of design according to our invention. Some key factors determining which technical approach will be best, for any particular application of the invention, are aperture size, response time, wavefront error, and optical power. We now believe that a particularly advantageous embodiment comprises a hybrid design—taking advantage of the best features of both.

Figure 9:
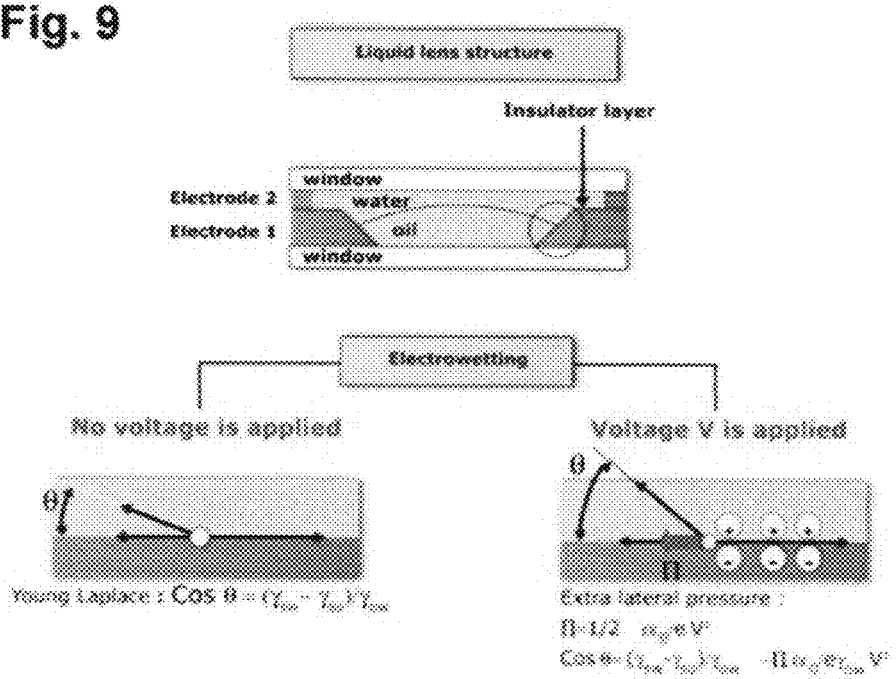
FIG. 9 is a diagram (after Varioptic), quite schematic, illustrating the principle of electrowetting applied to variable-focus lens design.

Merely by way of example, active diffractive elements may be preferred for a large-aperture lens (FIG. 10), while a liquid lens (FIGS. 4 and 9) may serve for a smaller lens. An active diffractive lens has a fixed number of possible Fresnel zones and therefore discrete optical powers associated with those zones (respectively). These factors lead to discrete-zoom capability. Inclusion of a liquid lens allows for continuous zoom.

Benefits of the scalable size of diffractive elements combined with the continuous nature of the optical power of the liquid-lens technology provides a large-aperture continuous zoom design. These technologies are introduced in these published Varioptic patent applications: "Lens with variable focus", and "Drop Centering Device"—respectively international publications number WO 99/18456 (priority date Oct. 8, 1997), and WO 00/58763 (priority date Oct. 5, 2000).

Liquid-Lens Technology

Variable optical power is achieved in current liquid-lens designs (FIG. 9), in which two nonmiscible fluids are contained within an enclosed volume that is bounded by a pair of annular electrodes and two transparent windows. In this approach an external voltage applied across the electrodes imposes an additional lateral pressure at the liquid-liquid-electrode interfaces. This lateral pressure modifies the wetting angle and thus the curvature of the liquid-liquid interface.

Liquid-liquid surface tension provides the forces required to maintain the local surface curvature, which is driven by the wetting angle; however, the limiting diameter, d, of the liquid lens depends on the capillary length, $\lambda$, $$d << \lambda = \sqrt{\frac{\gamma}{\Delta \rho a}} \quad (3)$$

where a is the local acceleration, $\gamma$ is the liquid-liquid interfacial tension, and $\Delta \rho$ is the density mismatch between the fluids. Liquid-liquid interfacial tensions of 40 mN/m and residual density differences of $10^{-3}$ g/cm$^3$ are currently achievable, leading to aperture diameters exceeding 10 mm. This limit can be overcome only by reducing the residual density $\Delta \rho$ or modifying the liquid-liquid interfacial tension—given that local acceleration is an operational constraint. According to preferred embodiments of our invention, a zoom capability of roughly 4× is possible using these components.

Though much research has been conducted to address many issues related to the design of active liquid lenses, an infrared (IR) design must deal with phenomena that may require further mitigation. For example, stability studies of the charged wetting line have shown that the drop-surface shape undulates, close to the edge. It is established that such a deformation dies exponentially with the distance to the edge. Introduction of different nonmiscible fluids for the IR waveband may change the coefficient of this decay, but there is no reason to believe that in the IR design these effects will be significantly larger than in existing designs.

Another well-known issue in electrowetting arises from hysteresis between the advancing and receding meniscus on the surface. The source of hysteresis is usually trapping of the wetting line from defects, resulting in irregular shapes for drops. This potential problem has been overcome by increasing the energy cost function (proportional to sin 2$\theta$) of the residual distortion of the wetting contour line—by modifying the initial contact angle. Practically, the contact angle using the electrode design (FIG. 9) starts for zero voltage at roughly 45°, this angle being adjusted by the oil volume injected in the drop.

Nevertheless, if small irregularities of the wetting line are present at a spatial scale $\xi$, it is well known that these distortions die exponentially at distances of order $\xi$ away from the drop perimeter. Thus the central part of the drop always has a consistent shape. We recommend investigating these effects more thoroughly during the design phase—but, again, there is no reason to believe they will limit the designs operating in the IR if appropriate nonmiscible fluids are identified.

Active Diffractive Lens Technology

As stated above, because the number of Fresnel zones possible with an active diffractive lens is fixed, available optical powers are discrete rather than continuous. Therefore in these lens the zoom capability is likewise discrete.

Our preferred approach for an active diffractive lens employs a photolithographically patterned thin diffractive lens with large aperture, fast response time, and a power-failure-safe configuration. The shape or "phase profile" of a refractive lens (FIG. 10, dashed line) can be compared with that of an ordinary ideal refractive lens (dotted line). The diffractive lens is produced by removing the multiple-2$\pi$ phase retardation from the refractive lens, resulting in multiple Fresnel zones. The phase jump at each zone boundary is 2$\pi$ for the design wavelength.

Figure 10:
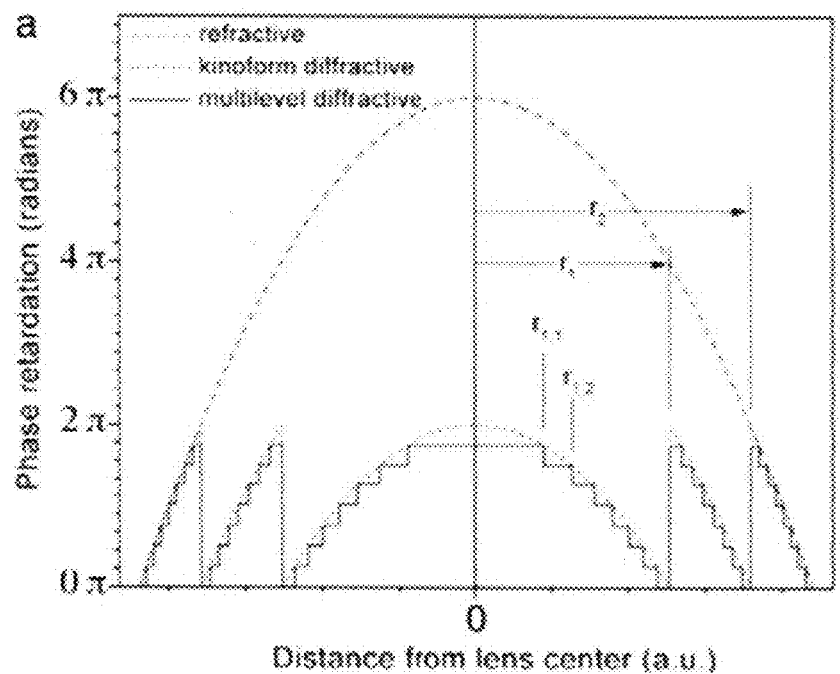
FIG. 10 is a graph comparing lens phase profiles for conventional refractive (dashed line) and diffractive (dotted line) lenses.

The outer radius of each zone is analytically derived. To digitize the process, the continuous phase profile in each zone is divided into multiple subzones with a series of discrete phase levels (FIG. 10). The discrete structure of such units approximates a continuous quadratic profile. We can increase diffraction efficiency by increasing the number of subzones—reaching maximum values of 40.5%, 81.1%, and 95.0% for lenses with two, four, and eight phase levels per zone, respectively.

Useful information about both types of electronically variable lenses is provided by this literature:

B. Berge, J. Peseux, "Variable Focal Lens Controlled by an External Voltage: an Application of Electrowetting," 3 *Eur. Phys. J.* E at 159-63 (2000);

M. Vallet, M. Vallade, and B. Berge, "Limiting Phenomena for the Spreading of Water on Polymer Films by Electrowetting," *Eur. Phys. J.* B, at 583-91 (1999);

Kress, B. and Mey, P. *Digital Diffractive Optics* (Wiley, New York, 2000); and

Farn, M. W. & Veldkamp, W. B. in II *Handbook of Optics*, ed. Bass, M. (McGraw-Hill, New York, 1994), Chap. 8, at 8.15.

Figure 11:
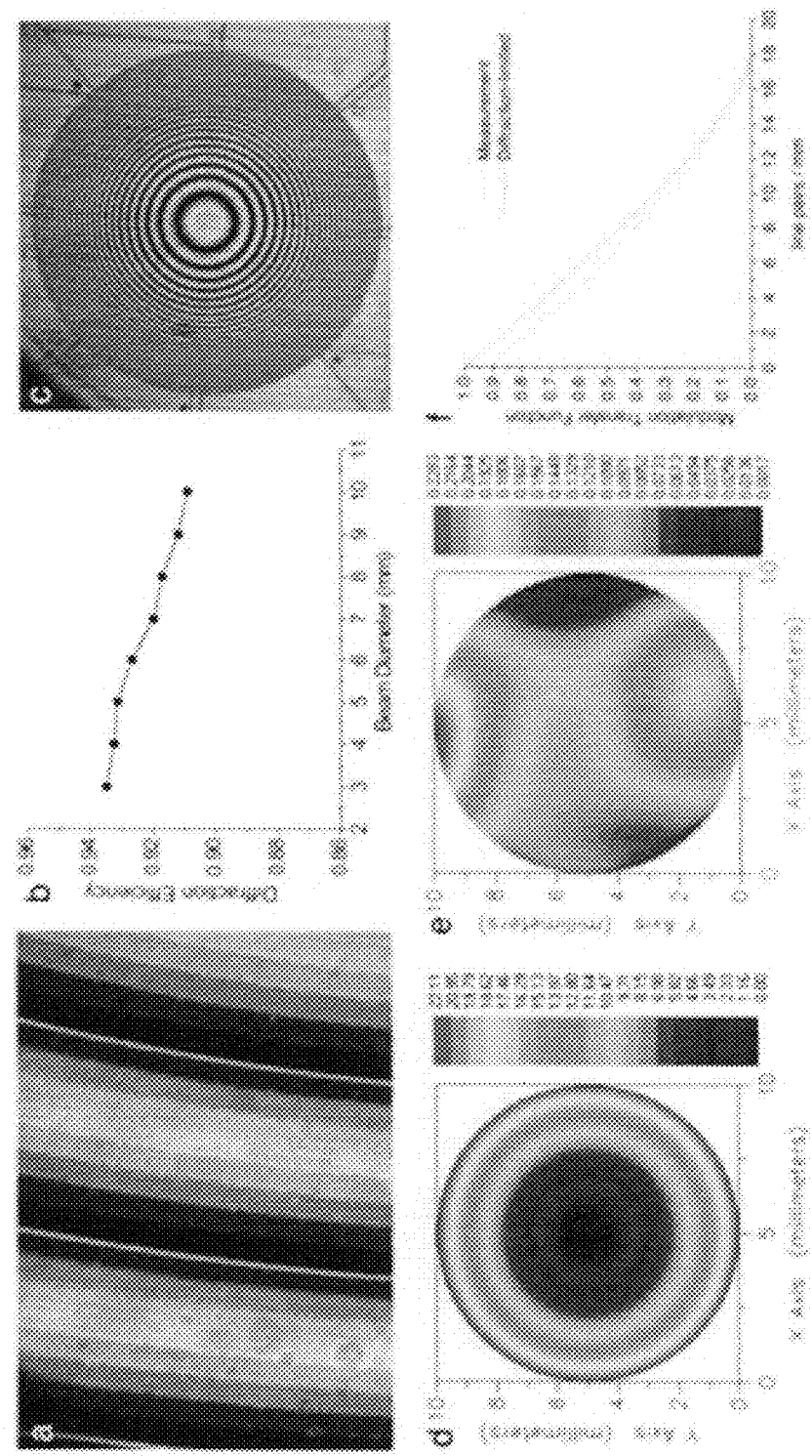
FIG. 11 is a composite illustration that includes a group of diagrams representing actual imaging and characterization of the University of Arizona 1-diopter lens—section (a) being electrooptic response of the lens obtained with a polarized microscope, section (b) diffraction efficiency as a function of the beam diameter, (c) an interferogram obtained with a Mach-Zehnder interferometer (showing an interference pattern with very good fringe modulation across the lens; a closeup of the interferogram shows that the eight subzones in each zone have different grayscale intensities, and the pattern is periodic), (d) an unwrapped phase map for a 10-mm aperture, (e) a phase map of the unwrapped phase minus tilting and focusing, and (f) the modulation transfer function ("MTF") of the lens.

A prototype lens (FIG. 11) developed at the University of Arizona has shown excellent performance. In the optically inactive state (voltage off) in which the lens has no focusing power, optical transmission across the visible spectrum is 85%, a value that can be increased by the use of higher-quality substrates and antireflection coatings. Monochromatic (543.5 nm) polarized microscopy images (FIG. 11a) of the lens in operation indicate that all eight electrode sets operated properly and provided discrete phase changes. Eight optimized drive voltages with amplitudes between 0 and 2 Vrms produced a maximum first-order diffraction efficiency of 91%, near the 95% predicted by scalar diffraction theory.

The measured diffraction efficiency as a function of lens area reaches 94% near the center of the lens, decreasing monotonically as the area is increased (FIG. 11b). Efficiency decreases because phase distortion due to the fringing field at the zone boundaries is more significant at the outer zones, where each electrode is narrower. At the edges of the electrodes, the electric field lines are not perpendicular to the liquid-crystal lens substrate, and the fringing fields cause the phase transitions at the zone boundaries to be less sharp than in the ideal case—thus inducing phase distortions and reducing the diffraction efficiencies.

For the objective system, high optical power will be obtained by having more Fresnel zones in a given aperture. This fact introduces two risks that should be addressed during design: the increasing complexity of the electrode design, and a potential decrease in the diffraction efficiency due to fringe fields at the zone boundaries.

Also deserving exploration are novel interdigitized electrode power-bus designs that allow multiple combinations of voltages to achieve the desired location of the zone boundaries—together with closer examination of electrode designs in relation to the fringe. One possibility that should be examined is use of better electrical insulators between adjacent electrodes, to increase the diffraction efficiency caused by fringe fields. Extending this technology to longer wavelengths will actually be easier since the outer radius of a subzone, for a fixed optical power, is proportional to the square root of the wavelength.

Alvarez Zoom Lenses

Assembly of two so-called "Alvarez lenses" in a Galilean-telescope configuration can be used to build a zoom lens. Much of the discussion here is paraphrased from Wallace, *Laser Focus World*, "Alvarez Lens Enters the Real World", Mar. 1, 2000, on the Internet at http://www.laserfocusworld.com/display_article/65985/12/none/none/News/Alvarez-lens-enters-the-real-world)

Figure 12A:
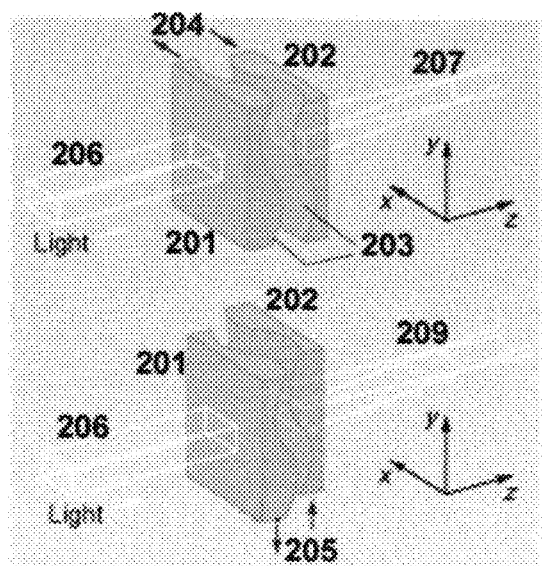
FIG. 12 is another composite diagram but very generally analogous to FIG. 9, and for a relatively new, alternative kind of variable-focus element known as an "Alvarez" zoom lens—section (a) of this diagram being a perspective or isometric view after John Wallace (*Laser Focus World*, "Alvarez Lens Enters the Real World", Mar. 1, 2000), highly schematic and with internal dimensions along the light-propagation direction greatly exaggerated, of such a two-plate device, section (b) a sagittal view of the optical surface of either plate, section (c) a group of three very highly schematic elevation or plan ray diagrams of such a lens with 4 mm pupil and (from top to bottom subviews) enlarging, neutral and reducing powers of −9.3, 0 and +9.3 diopters respectively and interplate translations of −0.3, 0.0 and 0.3 mm respectively, section (d) a ray diagram like the bottom subview of section (c) but more specifically a focusing lens with output rays converging to a point focus, section (e) a like diagram but with two plate pairs arranged as a Galilean telescope to form a zoom lens, the first pair being shown configured to function as an enlarging lens and the second as a recollimating lens so that the assemblage as configured functions as a two-times enlarger, and section (f) being for substantially the same assemblage as section (e) except that the first plate pair is shown configured to function as a reducing lens (and the second as a recollimating lens) so that the assemblage as configured functions as a two-times reducer.

As first conceived in the late 1960s, one Alvarez lens is made up of two complementary phase plates 201, 202 (FIG. 12a). Each plate is a transmissive, refractive element with a respective third-order polynomial surface 203—and each has an outer optical surface that is planar, as well as an inner contour in the two-dimensional cubic profile 203. When a single such "phase plate" is placed in an optical beam 206, the plate introduces a phase shift in the beam.

Ingeniously, however, the two Alvarez cubic surfaces 203 are formed as inverses of each other. Therefore when these complementary surfaces are placed facing each other with their vertices on the optical (z) axis, the induced phase variations cancel out. Now if the two plates undergo a relative transverse translation 204, 205 (i.e., along the x or y axis), the result is a phase variation, in the beam, which is the differential of the two cubic surface profiles 203.

Such a differential of two cubics has a quadratic optical-phase profile—that is to say, optical power. More specifically, tiny relative movements in the x or y direction induce cylindrical power, independently, in an orthogonal direction. Combinations of such movements can produce circular, elliptical, or cylindrical phase profiles.

Transverse translation of the plates in opposite directions thus leads to introduction of defocus into an incident wavefront. Such a pair of translated plates accordingly functions as a lens. Horizontal shifts 204 tend to bring an rectangular incident beam 206 to a vertical-line focus 207; and vertical shifts 205, to a horizontal-line focus 209.

While Alvarez lenses require mechanical motion, this motion is extremely small, particularly in comparison with the movement that a more-conventional mechanical zoom lens would require to achieve the same power changes. Displacement of only about 300 µm suffices to change the magnification of the lens for a 4× zoom telescope. Such small movement can be provided by piezoceramic actuators. This assemblage provides a continuously varying zoom system.

Figure 12B:
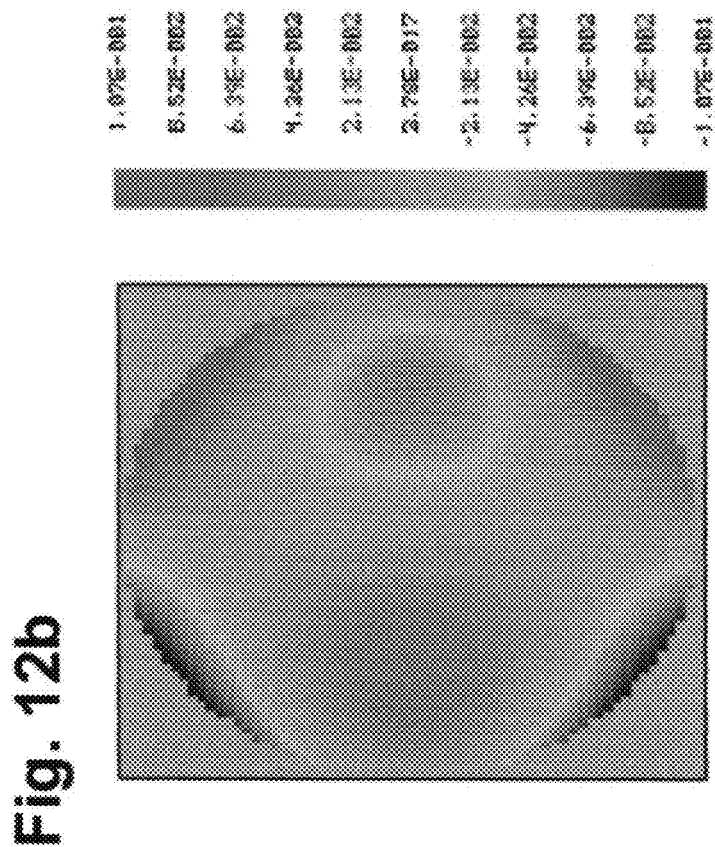

A sagittal view of the surface of one plate (FIG. 12b, note the color key at right) by color-coding displays the complexity of such a shape, with both positive and negative curvatures occurring across the surface. The complement is equivalent to rotating this surface 180°; therefore fabrication of only one of the two types of shapes is necessary.

Based on this surface profile, a variable power lens with powers ranging from −9.3 to +9.3 D (diopters) is achievable with a lateral displacement of 0.3 mm, as noted earlier. Focal properties of the Alvarez lens vary with transverse translation, as for example—with pupil diameter of 4 mm—to provide diverging rays 214 with −9.3 D for −300 µm translation 211 (FIG. 12c, top view); parallel rays 215 with zero power for no translation 212 (center view); or converging rays 216 with +9.3 D for +300 µm translation 213 (bottom view). By extension of the latter configuration to stronger convergence 218, a greater translation 217 can bring a collimated beam to a fine focus 219.

We have fabricated such plates in polymethyl methacrylate ("PMMA"), a popular shatterproof substitute for glass, using diamond turning. Also called for is a so-called "Fast Tool Servo" to allow lathe cutting of a surface that is not rotationally symmetric.

Alternatively the plates can be made of glass, e.g. BK7. Instead the third-order shapes can be stamped in plastic; the latter approach, being subject to relatively coarse tolerances, is likely to provide relatively low-end performance; a master mold-maker, however, may produce surprising optical quality.

All things considered, manufacture of two plates to create an adequate Alvarez lens is a demanding and difficult job, advisedly for a specialist optics shop. We have not yet located a fully suitable vendor.

The necessary fine controlled motion can be achieved with a stacked piezoceramic actuator—providing more robust movement than the gears, cams and motors of a traditional zoom lens. The German firm *Physik Instrumente* offers such an actuator (part number P-025.200) that can achieve this caliber of control. One actuator is needed for each phase-plate pair.

Figure 12E:
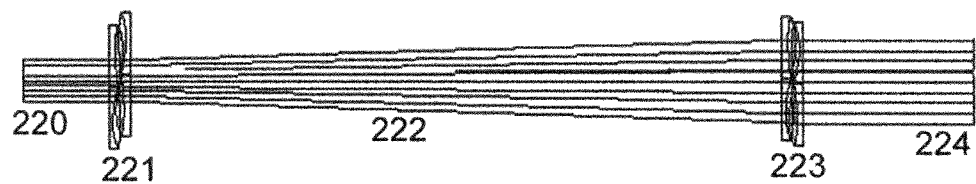
Figure 12F:
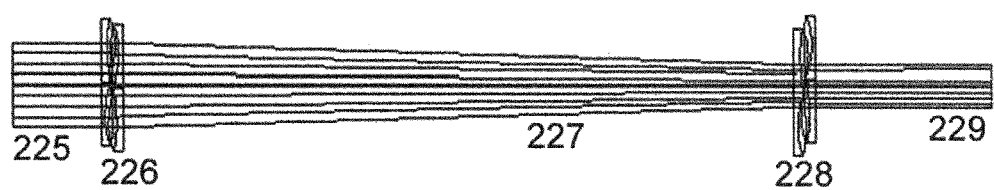

Considering achievable levels of motion and the surface sagittal view (FIG. 12b) discussed above, a zoom system based on a Galilean telescope can be created. The device consists of a positive and a negative element 221, 223 (FIG. 12e); 228, 226 (FIG. 12f).

The focal points of the two elements coincide, resulting in an afocal system. Additional fixed optics can be placed in front of or behind the telescope to vary the object distance and imaging of the afocal system.

To vary magnification, the power of the front element 221, 226 is changed and then the power of the second element 223, 228 adjusted to recollimate the light exiting from it. A 4× variable-magnification Galilean configuration with the first element 221 adjusted positive (FIG. 12e) and the second element 223 negative—causes ray divergence 222 between the elements, and an overall enlarging performance (that is, the recollimated beam 224 is broader than the incident beam 220).

Reversing the order, i.e. adjusting the first element 226 (FIG. 12f) to be negative and the second 228 positive, causes ray convergence 227 between the elements. Now the overall effect is instead reducing, with the recollimated beam 229 narrower than the incident beam 225.

Deformable Polymer Liquid Zoom Lens

Alternatively, lenses of this type, currently being developed by Holochip, vary the focus of the liquid lens by changing its aperture size. In the Holochip liquid lens, the key element is the circular periphery seal—which is similar to an iris diaphragm with rotatable impellers.

A lever actuator controls movement of the impellers, applying their pressure to the fluid-filled lens. The redistributed liquid changes the shape of the lens curvature, and thereby the focal length of the lens.

More generally in this overall type of lens, transparent polymer membranes pump liquid in and out by stretching or squeezing a chamber. The latter motion, with resulting contraction, ordinarily causes the lens to be a more strongly positive lens, and conversely.

Figure 13A:
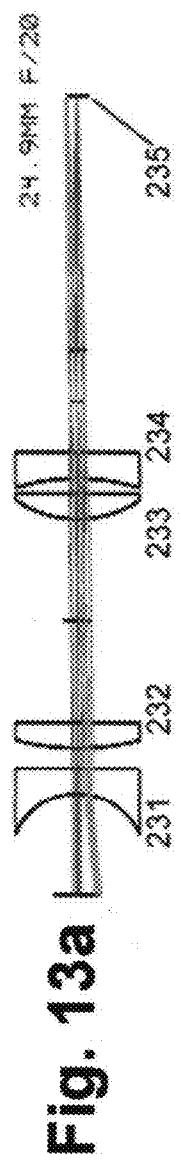
FIG. 13 is a like set of three plan or elevation diagrams for a still-different kind of variable-focus device called a "deformable polymer liquid-lens" zoom lens—section (a) portraying the zoom device configured as, typically, a wide-angle lens, section (b), a telephoto lens, and section (c), a normal lens.

By manipulating such controls, the first lens element 231 (FIG. 13a) can be made strongly positive and the second 232 negative—with the third 233 negative and the fourth 234 slightly positive. The result is wide-angle performance (e.g. 25 mm focal length in a 35 mm system) at the focal plane 235.

Figure 13B:
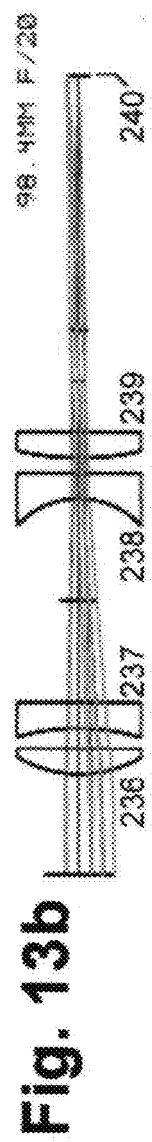

Instead manipulating the controls to stretch the chamber reverses these arrangements: the first element 236 (FIG. 13b) can be made negative, the second 237 weakly positive, the third 238 moderately negative and the fourth 239 positive—yielding telephoto performance (e.g. 98 mm focal length) at the focal plane 240. If the controls are manipulated to make all four elements 241-244 neutral, the overall performance becomes that of a "normal" lens (50 mm).

Figure 13C:
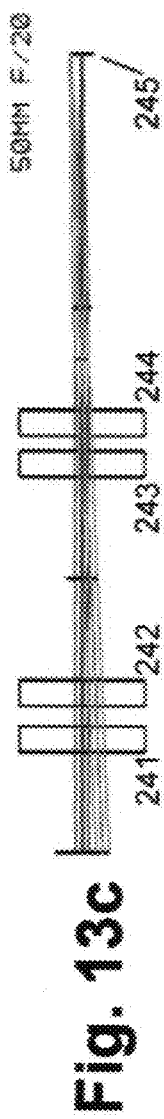

In this way, such a lens can be varied in effective focal length from e.g. roughly 25 mm (FIG. 13a) to 99 mm (FIG. 13b) to 50 mm (FIG. 13c). The illustrated design uses four lenses—and a low-index, low-dispersion liquid, modeled with acrylic, as well as a high-index, high-dispersion liquid, modeled with polystyrene (both being typical of the run of optically useful liquids)—to create a 4× zoom, with a minimum number of lens elements required to achieve achromatic performance.

Mechanical Zoom Lenses

Yet another alternative, as noted earlier, is a mechanical zoom lens. These devices are very well known, and commercially available in myriad variants such as the representative classic unit of U.S. Pat. No. 3,840,290, Betensky (FIG. 14), hereby incorporated in full by reference.

Figure 14:
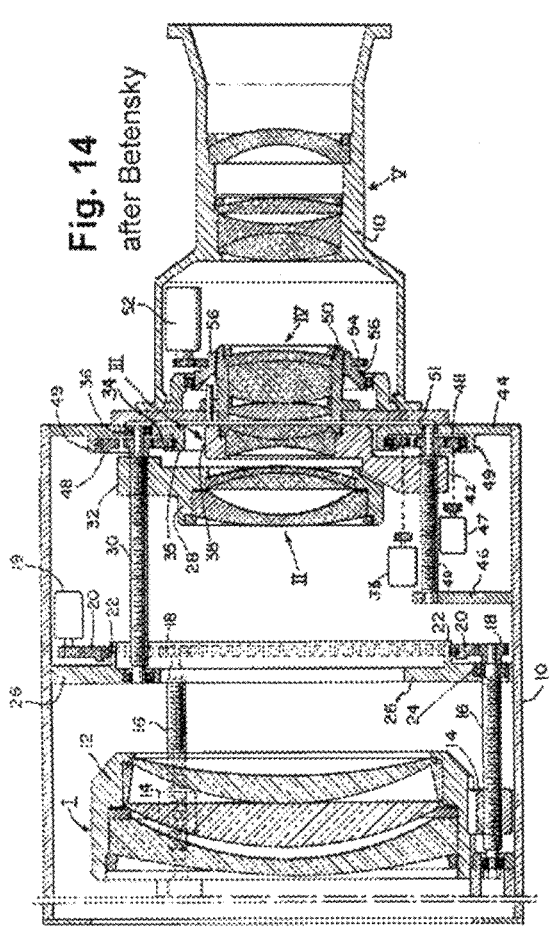
FIG. 14 is a diagram, in longitudinal section (after Betensky, U.S. Pat. No. 3,840,290), of a mechanical zoom lens: an essentially classic unit patented in 1974—selected only arbitrarily for display here as representative of a mechanical zoom lens.

Full construction details, as well as definitions associated with the callouts in FIG. 14, may be found in that patent. Note, however, that a zoom lens actually chosen for use in our roving foveal imager should ideally be amenable to electronic control.

In adapting a zoom lens for use in our roving foveal camera, the most critical parameter is mating the apertures of the imaging system and lens. This constraint, however, is accomplished in a generally conventional way.

Other considerations include selecting a mechanical zoom lens that has minimal operating friction and can be adjusted very rapidly. Also desirable is a lightweight unit that provides zoom magnification ranges such as specified earlier in this document.

In certain of the appended apparatus claims, the term "such" is used (instead of "said" or "the") in the bodies of the claims, when reciting elements of the claimed invention, for referring back to features which are introduced in preamble as part of the context or environment of the claimed invention. The purpose of this convention is to aid in more distinctly and emphatically pointing out which features are elements of the claimed invention, and which are parts of its context, thereby to more particularly claim the invention.

The foregoing disclosures are intended as exemplary, not to define the scope of the invention—which is set forth only by the appended claims.

We claim:

1. A method for operating an electrooptical observation system that produces simultaneous plural images for a region of interest, at least some of said plural images having respective plural resolutions; for use when the system also has an inertial-navigation system and a steering mirror and when the steering mirror intercepts and deflects radiation that forms the relatively narrower field of view, said method comprising the steps, by a remote operator, of:

operating the system to display simultaneous images having respective plural resolutions;

controlling the system to cause:

at least a first of the simultaneous plural images and a second of the simultaneous plural images to be formed simultaneously from radiation passing through a single optical aperture, radiation that is physically separated into the first and second of the simultaneous plural images formed on a plurality of physically separated imaging planes, including a lower resolution imaging plane and a higher resolution imaging plane;

the at least first of the simultaneous plural images to have a relatively wider field of view, and to continuingly cover a region of interest, and the at least second of the simultaneous plural images to have a narrower field of view, with finer resolution than the relatively-wider-field image, continuingly directed toward a particular detail or details within or associated with the region of interest;

using the system to:

identify and follow, in the second of the simultaneous plural images with the wider-field of view, the region of interest to maintain an overall situational awareness, and concurrently observe as a real-time telephoto view, in the first of the simultaneous plural images with the narrower-field of view, relatively higher-resolution data and visible scenes for relatively finer investigation and analysis of one or more specialized details;

operating the steering mirror to point the relatively narrower field toward a particular region of interest within the relatively wider field;

operating the system to employ the inertial-navigation system for measuring spatial coordinates of the relatively narrower view, or of at least one object therein, or both; and operating the system to incorporate information from the inertial-navigation system to substantially stabilize the steering mirror with respect to inertial space.

2. The method of claim 1, wherein the specialized details comprise at least one detail selected from the group consisting of:

structures;
vehicles;
moving objects;
animals;
marine creatures; and
people.

3. The method of claim 1, for use when the system is capable of at least one resolution corresponding generally to a hemispherical or panoramic field of regard; and further comprising the steps of:
  adjusting said relatively wider view to, very generally, a hemispherical or panoramic field of regard; and
  adjusting said relatively narrower field to a magnification in the range, between coarsest and finest magnification ratios, of three to twelve times.

4. The method of claim 1, for use when the system is capable of at least one resolution corresponding generally to a hemispherical or panoramic field of regard; and further comprising the steps of:
  adjusting said relatively wider view to, very generally, a hemispherical or panoramic field of regard; and
  adjusting said relatively narrower field to a magnification in the range, between coarsest and finest magnification ratios, of three to twelve times a lower resolution of the lower resolution imaging plane of the plurality of physically separated imaging planes.

5. The method of claim 1, wherein:
  the information-incorporating operating step also stabilizes the relatively narrower view with respect to the relatively wider view.

6. The method of claim 1, further comprising the step of: forwarding measured spatial-coordinate information to a remote facility or platform for use in another application.

7. The method of claim 6, further comprising the step of: using measured spatial-coordinate information to control an action.

8. The method of claim 7, for use when the system is mounted in a vehicle; and wherein the action-controlling step comprises:
  a course correction of the vehicle to avoid a collision or to effect a rendezvous.

9. The method of claim 7, wherein the action-controlling step comprises:
  a direct call for operating a weapon to impair an object or creature appearing in one or more of the images.

10. The method of claim 1, for use when the steering mirror is a two-axis steering mirror; and wherein the mirror-operating step comprises:
  adjusting the steering mirror in two generally orthogonal directions within the relatively wider field.

11. The method of claim 1, further the controlling the system to cause:
  the radiation to be physically separated into the first and second of the simultaneous plural images formed on the plurality of physically separated imaging planes by a beam splitter positioned in the single optical aperture.

12. The method of claim 11, further the controlling the system to cause:
  radiation forming the first of the simultaneous plural images to pass from the beam splitter to the steering mirror to the higher resolution imaging plane.

* * * * *